United States Patent
Wengreen et al.

(10) Patent No.: US 10,744,976 B1
(45) Date of Patent: Aug. 18, 2020

(54) SELF-DRIVING VEHICLE SYSTEMS AND METHODS

(71) Applicant: Drivent LLC, Bellevue, WA (US)

(72) Inventors: Eric John Wengreen, Sammamish, WA (US); Wesley Edward Schwie, Minneapolis, MN (US)

(73) Assignee: Drivent LLC, Bellevue, WA (US)

( * ) Notice: Subject to any disclaimer, the term of this patent is extended or adjusted under 35 U.S.C. 154(b) by 0 days.

(21) Appl. No.: 16/528,100

(22) Filed: Jul. 31, 2019

Related U.S. Application Data

(63) Continuation-in-part of application No. 16/266,698, filed on Feb. 4, 2019, now Pat. No. 10,377,342.

(60) Provisional application No. 62/823,552, filed on Mar. 25, 2019, provisional application No. 62/824,941, filed on Mar. 27, 2019, provisional application No. 62/836,525, filed on Apr. 19, 2019, provisional application No. 62/841,785, filed on May 1, 2019.

(51) Int. Cl.
| | |
|---|---|
| *B60R 22/48* | (2006.01) |
| *G05D 1/02* | (2020.01) |
| *B60N 2/00* | (2006.01) |
| *G06Q 50/26* | (2012.01) |
| *G06K 9/00* | (2006.01) |
| *G06Q 20/14* | (2012.01) |

(52) U.S. Cl.
CPC .............. *B60R 22/48* (2013.01); *B60N 2/002* (2013.01); *G05D 1/0276* (2013.01); *G06K 9/00255* (2013.01); *G06K 9/00288* (2013.01); *G06Q 20/14* (2013.01); *G06Q 50/26* (2013.01); *B60R 2022/4816* (2013.01); *B60R 2022/4866* (2013.01); *G05D 2201/0213* (2013.01)

(58) Field of Classification Search
None
See application file for complete search history.

(56) References Cited

U.S. PATENT DOCUMENTS

| | | |
|---|---|---|
| 4,212,069 A | 7/1980 | Baumann |
| 5,769,471 A | 6/1998 | Suzuki |
| 5,798,695 A | 8/1998 | Metalis |
| 5,871,063 A | 2/1999 | Young |
| 5,945,919 A | 8/1999 | Trask |
| 5,960,523 A | 10/1999 | Husby |
| 5,986,420 A | 11/1999 | Kato |
| 6,011,478 A | 1/2000 | Suzuki |

(Continued)

FOREIGN PATENT DOCUMENTS

| | | | |
|---|---|---|---|
| KR | 20050017888 A | * | 2/2005 |
| KR | 20090094569 A | * | 9/2009 |

OTHER PUBLICATIONS

Ahn Jin Deuk, Machine translation of KR-20090094569-A, Sep. 2009, espacenet.com (Year: 2009).*

(Continued)

*Primary Examiner* — David P. Merlino

(57) ABSTRACT

A seat-belt monitoring system can include a first self-driving vehicle having a first seat, a first seat belt, and a first seat belt sensor; and a second self-driving vehicle having a second seat, a second seat belt, and a second seat belt sensor. The first seat belt sensor may be configured to detect a buckled state of the first seat belt and an unbuckled state of the first seat belt. The second seat belt sensor may be configured to detect a buckled state of the second seat belt and an unbuckled state of the second seat belt.

20 Claims, 14 Drawing Sheets

(56) References Cited

U.S. PATENT DOCUMENTS

| | | |
|---|---|---|
| 6,081,088 A | 6/2000 | Ishihara |
| 6,530,251 B1 | 3/2003 | Dimig |
| 7,093,515 B2 | 8/2006 | Yamanoi |
| 7,298,250 B2 | 11/2007 | Inoue |
| 7,413,357 B2 | 8/2008 | Badalian |
| 7,698,078 B2 | 4/2010 | Kelty |
| 7,777,619 B2 | 8/2010 | Yopp |
| 7,999,701 B1 | 8/2011 | Xu |
| 8,078,359 B2 | 12/2011 | Small |
| 8,180,379 B2 | 5/2012 | Forstall |
| 8,255,124 B2 | 8/2012 | Van Houtan |
| 8,325,025 B2 | 12/2012 | Morgan |
| 8,433,934 B1 | 4/2013 | On |
| 8,634,980 B1 | 1/2014 | Urmson |
| 8,686,844 B1 | 4/2014 | Wine |
| 8,700,251 B1 | 4/2014 | Zhu |
| 8,818,608 B2 | 8/2014 | Cullinane |
| 8,849,494 B1 | 9/2014 | Herbach |
| 8,874,305 B2 | 10/2014 | Dolgov |
| 8,948,993 B2 | 2/2015 | Schulman |
| 8,949,016 B1 | 2/2015 | Ferguson |
| 8,954,217 B1 | 2/2015 | Montemerlo |
| 8,954,252 B1 | 2/2015 | Urmson |
| 8,965,621 B1 | 2/2015 | Urmson |
| 8,996,224 B1 | 3/2015 | Herbach |
| 9,008,890 B1 | 4/2015 | Herbach |
| 9,019,107 B2 | 4/2015 | Biondo |
| 9,026,300 B2 | 5/2015 | Ferguson |
| 9,119,038 B2 | 8/2015 | Woods |
| 9,120,484 B1 | 9/2015 | Ferguson |
| 9,120,485 B1 | 9/2015 | Dolgov |
| 9,139,133 B2 | 9/2015 | Eng |
| 9,194,168 B1 | 11/2015 | Lu |
| 9,262,914 B2 | 2/2016 | Purushothaman |
| 9,272,713 B1 * | 3/2016 | Dvoskin ............... B60W 40/08 |
| 9,290,174 B1 | 3/2016 | Zagorski |
| 9,429,947 B1 | 8/2016 | Wengreen |
| 9,459,622 B2 | 10/2016 | Abhyanker |
| 9,514,623 B1 | 12/2016 | Urrutia |
| 9,527,217 B1 | 12/2016 | Lowry |
| 9,562,785 B1 | 2/2017 | Racah |
| 9,646,326 B2 | 5/2017 | Goralnick |
| 9,646,356 B1 | 5/2017 | Schwie |
| 9,685,058 B2 | 6/2017 | Schmidt |
| 9,701,307 B1 | 7/2017 | Newman |
| 9,733,096 B2 | 8/2017 | Colijn |
| 9,894,484 B1 | 2/2018 | Pao |
| 9,915,949 B2 | 3/2018 | Schwie |
| 9,916,703 B2 | 3/2018 | Levinson |
| 9,953,283 B2 | 4/2018 | Sweeney |
| 9,953,539 B1 | 4/2018 | Gkiotsalitis |
| 10,036,642 B2 | 7/2018 | Ross |
| 10,050,760 B2 | 8/2018 | Ross |
| 10,082,789 B1 | 9/2018 | Szybalski |
| 10,093,324 B1 | 10/2018 | Szybalski |
| 10,115,029 B1 | 10/2018 | Day |
| 10,127,795 B1 | 11/2018 | Hwang |
| 10,176,517 B2 | 1/2019 | Goralnick |
| 10,223,844 B1 | 3/2019 | Schwie |
| 10,240,938 B1 | 3/2019 | Wengreen |
| 10,255,648 B2 | 4/2019 | Wengreen |
| 10,268,192 B1 | 4/2019 | Wengreen |
| 10,274,950 B1 | 4/2019 | Wengreen |
| 10,282,625 B1 | 5/2019 | Wengreen |
| 10,286,908 B1 | 5/2019 | Wengreen |
| 10,289,922 B1 | 5/2019 | Wengreen |
| 10,299,216 B1 | 5/2019 | Wengreen |
| 2002/0077876 A1 | 6/2002 | O'Meara |
| 2002/0121291 A1 | 9/2002 | Daum |
| 2003/0195696 A1 | 10/2003 | Jones |
| 2003/0214585 A1 | 11/2003 | Bakewell |
| 2004/0068354 A1 | 4/2004 | Tabe |
| 2004/0076280 A1 | 4/2004 | Ando |
| 2004/0219933 A1 | 11/2004 | Faith |
| 2007/0096447 A1 | 5/2007 | Tabe |
| 2007/0132567 A1 | 6/2007 | Schofield |
| 2007/0198144 A1 | 8/2007 | Norris |
| 2008/0030906 A1 | 2/2008 | Sato |
| 2008/0144944 A1 | 6/2008 | Breed |
| 2009/0132128 A1 * | 5/2009 | Marriott ............... B60R 22/48 701/45 |
| 2009/0140886 A1 | 6/2009 | Bender |
| 2009/0287367 A1 | 11/2009 | Salinger |
| 2009/0289443 A1 * | 11/2009 | Okezie ............... B60R 22/48 280/735 |
| 2010/0169199 A1 | 7/2010 | Fuller |
| 2011/0059341 A1 | 3/2011 | Matsumoto |
| 2011/0098017 A1 | 4/2011 | Berry |
| 2011/0267186 A1 | 11/2011 | Rao |
| 2012/0009845 A1 | 1/2012 | Schmelzer |
| 2012/0083960 A1 | 4/2012 | Zhu |
| 2012/0158251 A1 | 8/2012 | Van Houtan |
| 2013/0085817 A1 | 4/2013 | Pinkus |
| 2013/0132140 A1 | 5/2013 | Amin |
| 2013/0138460 A1 | 5/2013 | Schumann, Jr. |
| 2013/0197674 A1 | 8/2013 | Lowry |
| 2013/0214919 A1 * | 8/2013 | Bassali ............... B60R 22/48 340/457.1 |
| 2013/0231824 A1 | 9/2013 | Wilson |
| 2013/0246301 A1 | 9/2013 | Radhakrishnan |
| 2013/0335213 A1 | 12/2013 | Sherony |
| 2014/0129132 A1 | 5/2014 | Yoshizu |
| 2014/0129951 A1 | 5/2014 | Amin |
| 2014/0172727 A1 | 6/2014 | Abhyanker |
| 2014/0207541 A1 | 7/2014 | Nerayoff |
| 2014/0253314 A1 | 9/2014 | Rambadt |
| 2014/0316616 A1 | 10/2014 | Kugelmass |
| 2014/0336935 A1 | 11/2014 | Zhu |
| 2014/0350855 A1 | 11/2014 | Vishnuvajhala |
| 2015/0012833 A1 | 1/2015 | Foy |
| 2015/0046080 A1 | 2/2015 | Wesselius |
| 2015/0066284 A1 | 3/2015 | Yopp |
| 2015/0088421 A1 | 3/2015 | Foster |
| 2015/0120504 A1 | 4/2015 | Todasco |
| 2015/0148077 A1 | 5/2015 | Jelle |
| 2015/0149283 A1 | 5/2015 | Horstemeyer |
| 2015/0185034 A1 | 7/2015 | Abhyanker |
| 2015/0199619 A1 | 7/2015 | Ichinose |
| 2015/0206206 A1 * | 7/2015 | Puente ............... G06Q 30/0283 705/307 |
| 2015/0248689 A1 | 9/2015 | Paul |
| 2015/0271290 A1 | 9/2015 | Tao |
| 2015/0295949 A1 | 10/2015 | Chizeck |
| 2015/0339923 A1 | 11/2015 | Konig |
| 2015/0339928 A1 | 11/2015 | Ramanujam |
| 2015/0346727 A1 | 12/2015 | Ramanujam |
| 2015/0348221 A1 | 12/2015 | Pedersen |
| 2016/0027306 A1 | 1/2016 | Lambert |
| 2016/0027307 A1 | 1/2016 | Abhyanker |
| 2016/0034828 A1 | 2/2016 | Sarawgi |
| 2016/0034845 A1 | 2/2016 | Hiyama |
| 2016/0046261 A1 | 2/2016 | Gulash |
| 2016/0071056 A1 | 3/2016 | Ellison |
| 2016/0092976 A1 | 3/2016 | Marusyk |
| 2016/0116293 A1 | 4/2016 | Grover |
| 2016/0125735 A1 | 5/2016 | Tuukkanen |
| 2016/0140835 A1 | 5/2016 | Smith |
| 2016/0129880 A1 | 6/2016 | Cuddihy |
| 2016/0182170 A1 | 6/2016 | Daoura |
| 2016/0187150 A1 | 6/2016 | Sherman |
| 2016/0209220 A1 | 7/2016 | Laetz |
| 2016/0209843 A1 | 7/2016 | Meuleau |
| 2016/0216130 A1 * | 7/2016 | Abramson ......... G01C 21/3626 |
| 2016/0227193 A1 | 8/2016 | Osterwood |
| 2016/0247095 A1 | 8/2016 | Scicluna |
| 2016/0247106 A1 | 8/2016 | Dalloro |
| 2016/0247109 A1 | 8/2016 | Scicluna |
| 2016/0264021 A1 | 9/2016 | Gillett |
| 2016/0277560 A1 | 9/2016 | Gruberman |
| 2016/0301698 A1 | 10/2016 | Katara |
| 2016/0339928 A1 | 11/2016 | Mankin |
| 2016/0342934 A1 | 11/2016 | Michalik |
| 2016/0360382 A1 | 12/2016 | Gross |
| 2016/0364812 A1 | 12/2016 | Cao |

(56) References Cited

U.S. PATENT DOCUMENTS

| | | |
|---|---|---|
| 2016/0364823 A1 | 12/2016 | Coa |
| 2016/0370194 A1 | 12/2016 | Colijn |
| 2017/0024393 A1 | 1/2017 | Choksi |
| 2017/0050321 A1 | 2/2017 | Look |
| 2017/0068245 A1 | 3/2017 | Scofield |
| 2017/0075358 A1 | 3/2017 | Zhang |
| 2017/0089715 A1 | 3/2017 | Guo |
| 2017/0090480 A1 | 3/2017 | Ho |
| 2017/0103490 A1 | 4/2017 | Haparnas |
| 2017/0127215 A1 | 5/2017 | Khan |
| 2017/0129399 A1 | 5/2017 | Appukutty |
| 2017/0132540 A1 | 5/2017 | Haparnas |
| 2017/0144774 A1 | 5/2017 | Pollard |
| 2017/0147951 A1 | 5/2017 | Meyer |
| 2017/0147959 A1 | 5/2017 | Sweeney |
| 2017/0169535 A1 | 6/2017 | Tolkin |
| 2017/0213165 A1 | 7/2017 | Stauffer |
| 2017/0248949 A1 | 8/2017 | Moran |
| 2017/0248950 A1 | 8/2017 | Moran |
| 2017/0256147 A1 | 9/2017 | Shanahan |
| 2017/0277191 A1 | 9/2017 | Fairfield |
| 2017/0300053 A1 | 10/2017 | Wengreen |
| 2017/0301220 A1 | 10/2017 | Jarrell |
| 2017/0313321 A1 | 11/2017 | Jefferies |
| 2017/0316516 A1 | 11/2017 | Goldman-Shenhar |
| 2017/0316533 A1 | 11/2017 | Goldman-Shenhar |
| 2017/0316621 A1 | 11/2017 | Jefferies |
| 2017/0327082 A1 | 11/2017 | Kamhi |
| 2017/0337437 A1 | 11/2017 | Kanagaraj |
| 2017/0344010 A1 | 11/2017 | Rander |
| 2017/0352250 A1 | 12/2017 | de Barros Chapiewski |
| 2017/0357973 A1 | 12/2017 | Van Os |
| 2017/0363430 A1 | 12/2017 | Al-Dahle |
| 2017/0365030 A1 | 12/2017 | Shoham |
| 2017/0372394 A1 | 12/2017 | Chan |
| 2017/0372431 A1 | 12/2017 | Perl |
| 2018/0018833 A1* | 1/2018 | Kannappa ............... G07C 5/008 |
| 2018/0060778 A1 | 3/2018 | Guo |
| 2018/0061242 A1 | 3/2018 | Bavar |
| 2018/0075380 A1* | 3/2018 | Perl .................... G06Q 10/0635 |
| 2018/0075565 A1 | 3/2018 | Myers |
| 2018/0096601 A1 | 4/2018 | Chow |
| 2018/0108103 A1 | 4/2018 | Li |
| 2018/0109934 A1 | 4/2018 | Grube |
| 2018/0115924 A1 | 4/2018 | Harris |
| 2018/0126960 A1 | 5/2018 | Reibling |
| 2018/0130161 A1 | 5/2018 | Wengreen |
| 2018/0137693 A1 | 5/2018 | Raman |
| 2018/0156625 A1 | 6/2018 | Mangal |
| 2018/0157268 A1 | 6/2018 | Mangal |
| 2018/0189717 A1 | 7/2018 | Cao |
| 2018/0191596 A1 | 7/2018 | Bhaya |
| 2018/0196417 A1 | 7/2018 | Iagnemma |
| 2018/0211540 A1 | 7/2018 | Bedegi |
| 2018/0211541 A1 | 7/2018 | Rakah |
| 2018/0220189 A1 | 8/2018 | Hodge |
| 2018/0225749 A1 | 8/2018 | Shoen |
| 2018/0225890 A1 | 8/2018 | Jales Costa |
| 2018/0300816 A1 | 10/2018 | Perl |
| 2018/0338241 A1* | 11/2018 | Li ....................... H04L 67/1097 |
| 2018/0356239 A1 | 12/2018 | Marco |
| 2018/0357907 A1 | 12/2018 | Reiley |
| 2019/0035277 A1 | 1/2019 | Son |
| 2019/0050787 A1* | 2/2019 | Munafo ................ G06N 20/00 |
| 2019/0228654 A1* | 7/2019 | Olsen ................... B60W 40/09 |
| 2020/0117690 A1* | 4/2020 | Tran .................... G06F 16/9536 |
| 2020/0168008 A1* | 5/2020 | Kuncl ................... G07C 5/008 |

OTHER PUBLICATIONS

GHSA.org, "Seat belt laws", Jan. 2019 (Year: 2019).*
Lim Kyu Hyung, Machine Translation of KR-20050017888-A, Feb. 2005, espacenet.com (Year: 2005).*
Google Self-Driving Vehicle—Online prior to Apr. 13, 2016 at www.google.com/selfdrivingcar/.
Tesla Autopilot—Online prior to Apr. 13, 2016 at www.technologyreview.com/s/600772/10-breakthrough-technologies-2016-tesla-autopilot/.
Tesla Model S Software Version 7—Autopilot—Online prior to Apr. 13, 2016 at www.teslamotors.com/presskit/autopilot.
BMW Heads Up Display—Online prior to Apr. 13, 2016 at www.autotrader.com/car-news/full-color-heads-up-display-to-debut-on-new-3-series-132586.
Uber Details—Online prior to Apr. 13, 2016 at www.wikihow.com/Use-Uber.
Raspberry Pi: How can I detect the direction of a sound—Online prior to Apr. 13, 2016 at www.quora.com/Raspberry-Pi-1/How-can-I-detect-the-direction-of-a-sound.
Wikipedia: Biometric Device—Downloaded on Aug. 19, 2016 from en.wikipedia.org/wiki/Biometric_device.
Self-Driving Cars Go Public; Uber Offers Rides in Pittsburgh—Downloaded on Aug. 19, 2016 from www.yahoo.com/news/uber-autonomous-cars-haul-people-125127470.html?ref=gs.
Mark Harris, Uber Could Be First to Test Completely Driverless Cars in Public, Sep. 14, 2015, IEEE Spectrum, http://spectrum.ieee.org/cars-that-think/transportation/self-driving/uber-could-be-first-to-test-completely-driverless-cars-in-public.
Zach Epstein, You'll be riding in self-driving cars as soon as next year, May 6, 2016, BGR.com, http://bgr.com/2016105'06/lyfl-self-driving-cars-2017/, pp. 1-5.
Ramsey et al., GM, Lyft to Test Self-Driving Electric Taxis, May 5, 2016, The Wall Street Journal, http://www.wsj.com/articles/gm-lyft-to-test-self-driving-electric-taxis-1462460094, pp. 1-4.
Explain That Stuff: Smoke Detectors—Downloaded on Sep. 28, 2018 from www.explainthatstuff.com/smokedetector.html.
Nittan: EV-DP Smoke Detector—Downloaded on Sep. 28, 2018 from nittan.co.uk/products/products/ev/ev-dp.
Wikipedia: Rain Sensor—Downloaded on Sep. 28, 2018 from en.wikipedia.org/wiki/Rain_sensor.
Nest: Split-Spectrum White Paper—Downloaded on Oct. 1, 2018 from nest.com/support/images/misc-assets/Split-Spectrum-Sensor-White-Paper.pdf.
How Police Visually Detect Drunk Drivers—Downloaded on Oct. 19, 2018 from thelaw.com/law/how-police-visually-detect-drunk-drivers.185.
Velodyne VLS-128 LiDAR Sensor—Downloaded on Oct. 22, 2018 from velodynelidar.com/vls-128.html.
Waymo's Suite of Custom-Built, Self-Driving Hardware—Downloaded on Oct. 22, 2018 from medium.com/waymo/introducing-waymos-suite-of-custom-built-self-driving-hardware-c47d1714563.
Lidar—Downloaded on Oct. 24, 2018 from en.wikipedia.org/wiki/Lidar.
Radar—Downloaded on Oct. 24, 2018 from en.wikipedia.org/wiki/Radar.
Assisted GPS—Downloaded on Nov. 19, 2018 from lifewire.com/assisted-gps-1683306.
How GPS Works—Downloaded on Nov. 19, 2018 from lifewire.com/iphone-gps-set-up-1683393.
Indoor Positioning System—Downloaded on Nov. 19, 2018 from en.wikipedia.org/wiki/Indoor_positioning_system.
LTE—Downloaded on Nov. 27, 2018 from en.wikipedia.org/wiki/LTE_(telecommunication).
OTDOA—Downloaded on Nov. 27, 2018 from en.wikipedia.org/wiki/OTDOA.
Ping for Beginners—Downloaded on Jan. 30, 2019 from https://social.technet.microsoft.com/wiki/contents/articles/30110.ping-for-beginners.aspx.
How Power Door Locks Work—Downloaded on Jul. 16, 2019 from https://auto.howstuffworks.com/power-door-lock.htm/printable.

* cited by examiner

SELF-DRIVING VEHICLE SYSTEMS AND METHODS

CROSS-REFERENCE TO RELATED APPLICATIONS

The entire contents of the following application are incorporated by reference herein: U.S. patent application Ser. No. 16/266,698; filed Feb. 4, 2019; and entitled SELF-DRIVING VEHICLE SYSTEMS AND METHODS.

The entire contents of the following application are incorporated by reference herein: U.S. Patent Application No. 62/823,552; filed Mar. 25, 2019; and entitled SELF-DRIVING VEHICLE SYSTEMS AND METHODS.

The entire contents of the following application are incorporated by reference herein: U.S. Patent Application No. 62/824,941; filed Mar. 27, 2019; and entitled SELF-DRIVING VEHICLE SYSTEMS AND METHODS.

The entire contents of the following application are incorporated by reference herein: U.S. Patent Application No. 62/836,525; filed Apr. 19, 2019; and entitled SELF-DRIVING VEHICLE SYSTEMS AND METHODS.

The entire contents of the following application are incorporated by reference herein: U.S. Patent Application No. 62/841,785; filed May 1, 2019; and entitled SELF-DRIVING VEHICLE SYSTEMS AND METHODS.

BACKGROUND

Field

Various embodiments disclosed herein relate to vehicles. Certain embodiments relate to self-driving vehicles and seat belts.

Description of Related Art

Seat belts save thousands of lives every year. A seat belt, however, cannot protect a passenger if the passenger is not wearing the seat belt. Thus, there is a need for systems and methods that encourage seat belt use.

SUMMARY

The ability of self-driving vehicles to save lives is so impressive that society has a moral imperative to develop self-driving technology such that it can be widely adopted. Self-driving vehicles will save tens of thousands of lives per year. The majority of vehicle-related deaths are caused by driver error. Tests have shown that self-driving vehicles nearly eliminate self-inflicted accidents (although they are not immune to accidents caused by human drivers of other vehicles). Self-driving vehicles can have unlimited attention spans and can process complex sensor data nearly instantaneously.

Seat belts have been proven to save lives. One problem, however, is that people sometimes do not wear seat belts. Failing to wear a seat belt puts the rider at risk of death and puts the self-driving vehicle owner at risk of devastating financial loss. Various embodiments disclosed herein increase seat belt use.

In some embodiments, a seat-belt monitoring system comprises a first self-driving vehicle configured to transport a rider; a first seat coupled to the first self-driving vehicle; a first seat belt configured to secure the rider in the first seat; and/or a first seat belt sensor configured to detect at least one of a buckled state of the first seat belt and an unbuckled state of the first seat belt.

In some embodiments, a seat-belt monitoring system comprises a first occupancy sensor configured to detect the rider sitting in the first seat; and/or a computer system comprising at least one computer and located remotely relative to the first self-driving vehicle.

In some embodiments, a computer system comprises a processor and a memory having program instructions that when executed by the processor are configured to execute any of the steps described herein.

In some embodiments, a first self-driving vehicle comprises a computer system having a processor and a memory. The memory can comprise program instructions that when executed by the processor are configured to execute any of the steps described herein.

In some embodiments, a second self-driving vehicle comprises a computer system having a processor and a memory. The memory can comprise program instructions that when executed by the processor are configured to execute any of the steps described herein.

In some embodiments, a first self-driving vehicle comprises a computer system having a processor and a memory. The memory can comprise program instructions (e.g., of the first self-driving vehicle) that when executed by the processor are configured to send a first wireless communication to another computer system located remotely relative to the first self-driving vehicle.

In some embodiments, the first self-driving vehicle comprises first program instructions configured to send a first wireless communication to a remotely located computer system in response to the first occupancy sensor detecting the rider sitting in the first seat and in response to the first seat belt sensor detecting the unbuckled state.

In some embodiments, a computer system comprises second program instructions configured to send a second wireless communication to a remote computing device of the rider in response to the computer system receiving the first wireless communication. The second wireless communication can be configured to prompt the rider to place the first seat belt in the buckled state. The second wireless communication can be configured to warn the rider of a fine for the unbuckled state of the first seat belt.

In some embodiments, a computer system comprises a memory having a buckling history of the rider. The buckling history can comprise data indicative of past buckling behavior of the rider prior to the rider entering the first self-driving vehicle. The computer system can comprise second program instructions configured to update the buckling history in response to receiving the first wireless communication.

In some embodiments, the computer system comprises second program instructions configured to deny a future ride request from the rider in response to the computer system receiving the first wireless communication.

In some embodiments, the computer system comprises a memory having a buckling history of the rider. The computer system can comprise second program instructions configured to update the buckling history of the rider in response to receiving the first wireless communication. The second program instructions can be configured to deny a future ride request of the rider in response to the computer system analyzing the buckling history.

In some embodiments, the computer system comprises a memory having a buckling history of the rider. The buckling history can be at least partially based on the first wireless communication. The computer system can comprise second program instructions configured to determine a future ride price for the rider at least partially based on the buckling history.

In some embodiments, the seat-belt monitoring system comprises a computer system having at least one computer. The computer system can be located remotely relative to the first self-driving vehicle (e.g., the computer system is not mechanically coupled to the first self-driving vehicle). Even though the computer system is not mechanically coupled to the first self-driving vehicle, the computer system may be communicatively coupled to the first self-driving vehicle.

In some embodiments, the first self-driving vehicle comprises first program instructions configured to send a first wireless communication to the computer system in response to the first seat belt sensor detecting the unbuckled state.

In some embodiments, the computer system comprises second program instructions configured to fine an account of the rider in response to the computer system receiving the first wireless communication.

In some embodiments, the first wireless communication comprises an identification of the rider. The identification can be configured to enable the second program instructions to fine the account.

In some embodiments, the first wireless communication comprises data configured to enable the computer system to identify an account of the rider. Identifying the account of the rider can enable the system to fine the account of the rider instead of mistakenly fining the account of another person.

In some embodiments, the seat-belt monitoring system comprises many self-driving vehicles. In some embodiments, the seat-belt monitoring system comprises a second self-driving vehicle having a second seat belt and a second seat belt sensor. The second seat belt sensor can be configured to detect at least one of a buckled state of the second seat belt and an unbuckled state of the second seat belt.

In some embodiments, the computer system comprises second program instructions. The second self-driving vehicle can comprise third program instructions configured to send a second wireless communication to the computer system in response to the second seat belt sensor detecting the unbuckled state of the second seat belt. The second self-driving vehicle can comprise third program instructions configured to send a second wireless communication to the computer system in response to both the second seat belt sensor detecting the unbuckled state of the second seat belt and a second occupancy sensor detecting the rider sitting in the second seat.

In some embodiments, the computer system comprises a memory having a buckling history of the rider. The buckling history can comprise data indicative of buckling behavior of the rider. The buckling history data can be at least partially based on the first wireless communication and the second wireless communication.

In some embodiments, the second program instructions of the computer system are configured to fine an account of the rider a first amount in response to the computer system receiving the first wireless communication, and the second program instructions are configured to fine the account a second amount in response to the computer system receiving the second wireless communication.

In some embodiments, the second program instructions are configured to make the second amount larger than the first amount in response to the computer system receiving the second wireless communication after receiving the first wireless communication.

In some embodiments, the computer system is configured to determine a future ride price at least partially based on the first wireless communication and the second wireless communication such that the future ride price is at least partially affected by a buckling history of the rider.

In some embodiments, the second program instructions are configured to increase the future ride price in response to the buckling history indicating the unbuckled state of the first seat belt and the unbuckled state of the second seat belt.

In some embodiments, a seat-belt monitoring system comprises a first occupancy sensor configured to detect the rider sitting in the first seat. The first self-driving vehicle can comprise first program instructions configured to exit a first driving mode and enter a second driving mode in response to the first occupancy sensor detecting the rider sitting in the first seat and in response to the first seat belt sensor detecting the unbuckled state.

In some embodiments, just detecting the unbuckled state is insufficient to trigger a reaction (because an unbuckled state could simply be due to the seat being unoccupied). Detecting the unbuckled state and detecting the rider sitting in the seat, however, can trigger a reaction, according to some embodiments.

In some embodiments, the first self-driving vehicle comprises an object detection system having at least one of a camera, a radar, and a lidar. The object detection system can be configured to detect a second vehicle on a road to enable the first self-driving vehicle to avoid colliding with the second vehicle. First program instructions can be configured to maintain a greater minimum distance (and/or a greater average distance) from the first self-driving vehicle to the second vehicle in the second mode than in the first mode. The second mode can be configured to keep the first self-driving vehicle farther away from other vehicles than the first mode. In some embodiments, the minimum distance of the second mode is less than 10 meters and the minimum distance of the first mode is less than 5 meters. In some embodiments, the minimum distance of the second mode is less than 15 meters and the minimum distance of the first mode is less than 10 meters. In some embodiments, the minimum distance of the second mode is at least two meters greater than the minimum distance of the first mode.

In some embodiments, the first self-driving vehicle comprises an object detection system having at least one of a camera, a radar, and a lidar. The object detection system is configured to detect objects on roads to enable the first self-driving vehicle to avoid colliding with the objects.

In some embodiments, in the first driving mode the first program instructions are configured to exceed a first safety threshold while using the object detection system to avoid colliding with the objects while driving on the roads. In some embodiments, in the second driving mode the first program instructions are configured to exceed a second safety threshold while using the object detection system to avoid colliding with the objects while driving on the roads. The second safety threshold is configured to have a lower probability than the first safety threshold of colliding with objects.

In some embodiments of the first driving mode, the first program instructions are configured to cause the first self-driving vehicle to transport the rider. In some embodiments of the second driving mode, the first program instructions are configured to cause the first self-driving vehicle to find a location to park.

In some embodiments, the seat-belt monitoring system comprises a first occupancy sensor configured to detect the rider sitting in the first seat. The first self-driving vehicle can comprise a camera and first program instructions. The first program instructions can be configured to cause the camera to take a picture of the rider in the first seat in response to the first occupancy sensor detecting the rider sitting in the first seat and in response to the first seat belt sensor detecting the unbuckled state.

In some embodiments, the seat-belt monitoring system comprises a computer system having at least one computer. The computer system can be located remotely relative to the first self-driving vehicle (e.g., such that the computer system is not mechanically coupled to the self-driving vehicle). The first program instructions can be configured to send a first wireless communication comprising the picture to the computer system in response to the first occupancy sensor detecting the rider sitting in the first seat and in response to the first seat belt sensor detecting the unbuckled state.

In some embodiments, the seat-belt monitoring system comprises a first occupancy sensor configured to detect the rider sitting in the first seat. The seat-belt monitoring system can comprise a computer system comprising at least one computer. The computer system can be located remotely relative to the first self-driving vehicle (e.g., such that the computer system is not mechanically coupled to the self-driving vehicle). The computer system can comprise a memory having a buckling history of the rider. The first self-driving vehicle can comprise a camera configured to take a picture of the rider in the first seat during the unbuckled state.

In some embodiments, the first self-driving vehicle comprises first program instructions configured to send a first wireless communication to the computer system in response to the first occupancy sensor detecting the rider sitting in the first seat and in response to the first seat belt sensor detecting the unbuckled state. The computer system can comprise second program instructions configured to save the picture to the memory such that the buckling history of the rider comprises the picture as evidence of the unbuckled state. Saving the picture as evidence can enable sending the picture to the rider (e.g., to show the rider that she was the one who was unbuckled as the vehicle was moving). Some embodiments comprise sending the picture to a remote computing device of the rider (e.g., in response to the computer system receiving the first wireless communication).

In some embodiments, the seat-belt monitoring system comprises a computer system having at least one computer. The computer system can comprise second program instructions configured to notify the rider, at least partially in response to the second program instructions analyzing at least one of road conditions, a travel route, and traffic conditions, that the rider is permitted to unbuckle the first seat belt. The second program instructions can analyze at least one of road conditions, a travel route, and traffic conditions, and then in response to the analysis, the second program instructions can notify the rider that the rider is permitted to unbuckle the first seat belt.

In some embodiments, the seat-belt monitoring system comprises a computer system having at least one computer. The first self-driving vehicle can comprise an object detection system having at least one of a camera, a radar, and a lidar. The object detection system can be configured to detect a second vehicle. The computer system can comprise second program instructions configured to notify the rider, at least partially in response to analyzing a distance from the first self-driving vehicle to the second vehicle, that the rider is permitted to unbuckle the first seat belt.

In some embodiments, a computer system can comprise second program instructions configured to notify the rider to buckle the first seat belt, wherein the notifying is at least partially in response to the second program instructions analyzing at least one of road conditions, a travel route, and traffic conditions. The second program instructions can analyze at least one of road conditions, a travel route, and traffic conditions, and then in response to the analysis, the second program instructions can notify the rider to buckle the first seat belt.

In some embodiments, the seat-belt monitoring system comprises a computer system having at least one computer. The computer system comprises second program instructions configured to instruct the rider to buckle the first seat belt in response to the first seat belt sensor detecting the unbuckled state and in response to the second program instructions analyzing at least one of road conditions and traffic conditions.

In some embodiments, the seat-belt monitoring system comprises a computer system having at least one computer. The first self-driving vehicle can comprise an object detection system having at least one of a camera, a radar, and a lidar. The object detection system can be configured to detect a second vehicle. The computer system can comprise second program instructions configured to instruct the rider to buckle the first seat belt in response to the first seat belt sensor detecting the unbuckled state and in response to the object detection system analyzing a distance from the first self-driving vehicle to the second vehicle.

In some embodiments, the seat-belt monitoring system comprises a first weight sensor configured to detect first data indicative of a first weight of the rider sitting in the first seat coupled to the first self-driving vehicle. The seat-belt monitoring system can comprise a computer system comprising at least one computer. The first self-driving vehicle can be configured to send a first wireless communication comprising the first data to the computer system. The seat-belt monitoring system can comprise a second self-driving vehicle having a second seat and a second weight sensor configured to detect second data indicative of a second weight of an unknown rider sitting in the second seat. The computer system can comprise second program instructions configured to determine that the unknown rider is the rider in response to comparing the second data to the first data.

In some embodiments, the seat-belt monitoring system comprises a first occupancy sensor configured to detect the rider sitting in the first seat. The seat-belt monitoring system can comprise a computer system comprising at least one computer. The computer system can comprise second program instructions configured to receive an identification of the rider. The second program instructions can be configured to receive from the first occupancy sensor an indication of the rider sitting in the first seat. The second program instructions can be configured to record that the rider is sitting in the first seat in response to receiving the identification and the indication.

In some embodiments, the first self-driving vehicle comprises an audio speaker. The first program instructions can be configured to cause the audio speaker to emit words instructing the rider to put the first seat belt in the buckled state in response to the first seat belt sensor detecting the unbuckled state. The words can warn the rider that the rider will receive a fine if the rider does not put the first seat belt in the buckled state.

In some embodiments, the first self-driving vehicle comprises at least one of an audio speaker and a display screen. The first program instructions can be configured to at least one of cause the audio speaker to emit words and cause the display screen to display the words. The words can be configured to warn the rider to put the first seat belt in the buckled state to avoid a fine.

Additionally, the disclosure includes a self-driving vehicle comprising a first seat coupled to the vehicle; a crash detection system coupled to the vehicle, the crash detection system comprising at least one of a camera, a radar, a lidar, and an accelerometer; and at least one motor coupled to the first seat and communicatively coupled to the crash detection system. The at least one motor may be arranged and configured to move the first seat in response to the crash detection system detecting an indication of an imminent crash.

In some embodiments, the at least one motor is arranged and configured to rotate the first seat in response to the crash detection system detecting the indication of the imminent crash. In some embodiments, the at least one motor is arranged and configured to rotate the first seat so that the first seat faces a center of the self-driving vehicle. In some embodiments, the at least one motor is arranged and configured to rotate the first seat so that the first seat faces away from a predicted location of the imminent crash.

Furthermore, in some embodiments, the at least one motor is arranged and configured to raise the first seat in response to the crash detection system detecting the indication of the imminent crash. In some embodiments, the at least one motor is arranged and configured to lower the first seat in response to the crash detection system detecting the indication of the imminent crash.

Even still, in some embodiments, the at least one motor is arranged and configured to move at least a portion of a head rest of the first seat in response to the crash detection system detecting the indication of the imminent crash. In some embodiments, the at least one motor is arranged and configured to raise at least the portion of the head rest of the first seat. In some embodiments, the at least one motor is arranged and configured to lower at least the portion of the head rest of the first seat.

Additionally, in some embodiments, the at least one motor is arranged and configured to adjust a firmness setting of at least a portion of the first seat in response to the crash detection system detecting the indication of the imminent crash. In some embodiments, the at least one motor is arranged and configured to adjust the firmness setting to be more firm than prior to detecting the indication of the imminent crash. In some embodiments, the at least one motor is arranged and configured to adjust the firmness setting to be less firm than prior to detecting the indication of the imminent crash.

In some embodiments, the vehicle also includes a first occupancy sensor coupled to the first seat, the first occupancy sensor configured to detect the rider sitting in the first seat. In some embodiments, the motor is arranged and configured to disable movement of the first seat in response to the first occupancy sensor detecting that no person is sitting in the first seat.

In some embodiments, the self-driving vehicle also includes a first seat belt sensor coupled to a first seat belt of the first seat, the first seat belt sensor configured to detect at least one of a buckled state of the first seat belt and an unbuckled state of the first seat belt. In some embodiments, the motor is arranged and configured to disable movement of the first seat in response to the first seat belt sensor detecting the unbuckled state of the first seat belt.

The first occupancy sensor may include at least one of a camera, an infrared camera, and a weight sensor. In some embodiments, the self-driving vehicle further includes a second seat coupled to the vehicle; and at least one motor coupled to the second seat and communicatively coupled to the crash detection system. The at least one motor of the second seat may be arranged and configured to move the second seat in response to the crash detection system detecting the indication of the imminent crash.

The disclosure also includes a self-driving vehicle including a first seat coupled to the vehicle; a crash detection system coupled to the vehicle; and at least one motor coupled to the first seat and communicatively coupled to the crash detection system. In some embodiments, the crash detection system comprises at least one of a camera, a radar, a lidar, and an accelerometer. The at least one motor may be arranged and configured to move the first seat in response to the crash detection system detecting an indication of an imminent crash.

In some embodiments, the at least one motor is arranged and configured to rotate the first seat in response to the crash detection system detecting the indication of an imminent crash. In some embodiments, the at least one motor is arranged and configured to rotate the first seat so that the first seat faces a center of the self-driving vehicle. In some embodiments, the at least one motor is arranged and configured to rotate the first seat so that the first seat faces away from a predicted location of the imminent crash. In some embodiments, the at least one motor is arranged and configured to raise the first seat in response to the crash detection system detecting the indication of the imminent crash. In some embodiments, the at least one motor is arranged and configured to lower the first seat in response to the crash detection system detecting the indication of the imminent crash. In some embodiments, the at least one motor is arranged and configured to move at least a portion of a head rest of the first seat in response to the crash detection system detecting the indication of the imminent crash. In some embodiments, the at least one motor is arranged and configured to raise at least the portion of the head rest of the first seat. In some embodiments, the at least one motor is arranged and configured to lower at least the portion of the head rest of the first seat.

In some embodiments, the at least one motor is arranged and configured to adjust a firmness setting of at least a portion of the first seat in response to the crash detection system detecting the indication of the imminent crash. In some embodiments, the at least one motor is arranged and configured to adjust the firmness setting to be more firm than prior to detecting the indication of the imminent crash. In some embodiments, the at least one motor is arranged and configured to adjust the firmness setting to be less firm than prior to detecting the indication of the imminent crash.

In some embodiments, the self-driving vehicle includes a first occupancy sensor coupled to the first seat, the first occupancy sensor configured to detect the rider sitting in the first seat. Accordingly, in some embodiments, the motor is arranged and configured to disable movement of the first seat in response to the first occupancy sensor detecting that no rider is sitting in the first seat. The first occupancy sensor may comprise at least one of a camera, infrared camera, and a weight sensor.

Even still, in some embodiments, the self-driving vehicle includes a first seat belt sensor coupled to a first seat belt of the first seat. The first seat belt sensor may be configured to detect at least one of a buckled state of the first seat belt and an unbuckled state of the first seat belt. In some embodiments, the motor is arranged and configured to disable movement of the first seat in response to the first seat belt sensor detecting the unbuckled state of the first seat belt.

In some embodiments, the self-driving vehicle further includes a second seat coupled to the vehicle; and at least one motor coupled to the second seat and communicatively coupled to the crash detection system. In some embodiments, the at least one motor of the second seat is arranged and configured to move the second seat in response to the crash detection system detecting the indication of the crash imminent.

The disclosure also includes a method of using a self-driving vehicle comprising detecting an indication of an imminent crash, by a crash detection system coupled to the vehicle. In some embodiments, the crash detection system comprises at least one of a camera, a radar, a lidar, and an accelerometer. In some embodiments, in response to detecting the indication of the imminent crash, moving a first seat coupled to the vehicle, by at least one motor coupled to the first seat and communicatively coupled to the crash detection system.

In some embodiments, the method includes rotating, by the at least one motor, the first seat in response to detecting the indication of the imminent crash. In some embodiments, the method includes determining, by the crash detection system, a predicted location of the imminent crash with respect to the vehicle. Additionally, in some embodiments, the method includes rotating, by the at least one motor, the first seat so that the first seat faces away from the predicted location of the imminent crash in response to detecting the indication of the imminent crash.

In some embodiments, the method includes raising, by the at least one motor, the first seat in response to the crash detection system detecting the indication of the imminent crash. Likewise, in some embodiments, the method includes lowering, by the at least one motor, the first seat in response to the crash detection system detecting the indication of the imminent crash.

In order to provide additional support to the rider, in some embodiments, the method includes moving at least a portion of a head rest of the first seat, by the at least one motor, in response to the crash detection system detecting the indication of the imminent crash. In some embodiments, the method includes raising at least the portion of the head rest, by the at least one motor, in response to the crash detection system detecting the indication of the imminent crash. In some embodiments, the method includes lowering at least the portion of the head rest, by the at least one motor, in response to the crash detection system detecting the indication of the imminent crash.

Furthermore, in some embodiments, the method includes adjusting, by the at least one motor, a firmness of at least a portion of the first seat in response to the crash detection system detecting the indication of the imminent crash. In some embodiments, the method includes increasing, by the at least one motor, the firmness of at least the portion of the first seat in response to the crash detection system detecting the indication of the imminent crash. In some embodiments, the method includes decreasing, by the at least one motor, the firmness of at least the portion of the first seat in response to the crash detection system detecting the indication of the imminent crash.

In some embodiments, the method includes detecting, by a first occupancy sensor coupled to the first seat, whether a rider is sitting in the first seat. In some embodiments, the method includes disabling, by the crash detection system, movement of the first seat in response to detecting that no rider is sitting in the first seat. In some embodiments, the method includes enabling, by the crash detection system, movement of the first seat in response to detecting that the rider is sitting in the first seat. In some embodiments, the method includes moving the first seat in response to detecting that the rider is sitting in the first seat.

Additionally, in some embodiments, the method includes detecting, by a first seat belt sensor coupled to a first seat belt, at least one of a buckled state of the first seat belt and an unbuckled state of the first seat belt. In some embodiments, the method includes disabling, by the crash detection system, movement of the first seat in response to detecting the unbuckled state of the first seat belt. In some embodiments, the method includes enabling, by the crash detection system, movement of the first seat in response to detecting the buckled state of the first seat belt. In some embodiments, the method includes moving the first seat in response to detecting the buckled state of the first seat belt.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
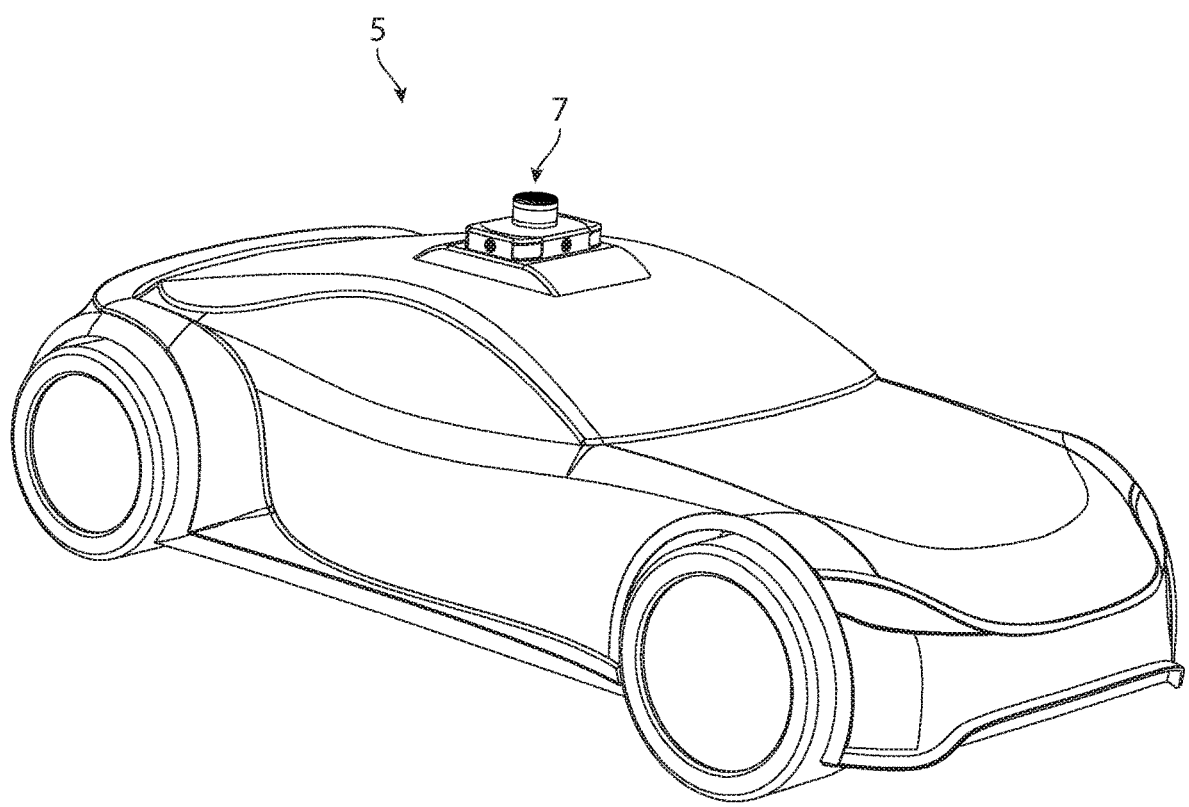
FIG. 1 illustrates a perspective view of a self-driving vehicle, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Self-driving vehicles will save tens of thousands of lives per year. The majority of vehicle-related deaths are caused by driver errors. Tests have shown that self-driving vehicles nearly eliminate self-inflicted accidents (although they are not immune to accidents caused by human drivers of other vehicles).

Self-driving vehicles typically have unlimited attention spans and can process complex sensor data nearly instantaneously. (Waymo LLC and Tesla Motors Inc. have built self-driving vehicles.) The ability of self-driving vehicles to save lives is so impressive that society has a moral imperative to develop self-driving technology such that it can be widely adopted.

Although self-driving vehicles will unlock many safety benefits, there are several barriers to rapid adoption of self-driving vehicles. Some of the embodiments described herein overcome several of these barriers.

Self-driving vehicles are sometimes referred to as autonomous cars, autonomous vehicles, driverless cars, and driverless vehicles. Various levels of "self-driving" behaviors are available to sense surrounding environments and navigate appropriately (e.g., without hitting objects, in a time-efficient manner). Levels of self-driving vehicles comprise Level 1 (Driver Assistance), Level 2 (Partial Automation), Level 3 (Conditional Automation), Level 4 (High Automation), and Level 5 (Full Automation). Of course, other levels and distinctions are possible. The National Highway Traffic Safety Administration has outlined various levels of self-driving vehicle automation based on information from the Society of Automotive Engineers.

Some embodiments can be used with self-driving vehicles. Embodiments, however, are not limited to self-driving vehicles and can be used with non-self-driving vehicles.

As used herein, "location" is used broadly and is not limited to a street address. A location can be a Global Positioning System ("GPS") location and can be any other location indicator. A location can be an outdoor location. A location can be an indoor location (e.g., a location inside a large shopping center, an apartment complex or other building).

Some embodiments use iBeacon hardware to enable tracking remote computing devices indoors. iBeacon is a protocol developed by Apple Inc. Several embodiments use radio transceivers (such as Bluetooth transceivers) to enable tracking remote computing devices indoors.

Some embodiments use Global Positioning System ("GPS") hardware to determine an outdoor location of a remote computing device or vehicle. GPS can include the system of satellites put into orbit and maintained by the U.S. Department of Defense, Russia's GLONASS satellite system, assisted GPS systems, and/or any satellite system used to provide location data.

In some embodiments, each system comprises at least one processor and a memory comprising program instructions that when executed by the at least one processor cause the system to perform any of the method steps described herein and/or incorporated by reference.

FIG. 1 illustrates a perspective view of a self-driving vehicle 5. The self-driving vehicle 5 can include a detection system 7 configured to detect objects (e.g., cars, pedestrians, other vehicles, buildings, fire hydrants, trees, lane markers, guardrails, roadway barriers, sidewalks, roadway signs, traffic lights) located around the self-driving vehicle 5. Various sensors of the detection system 7 can sense objects even closer than an inch away (e.g., by using ultrasonic sensors 73) and even farther away than 100 yards (e.g., using long-range radar).

Figure 2:
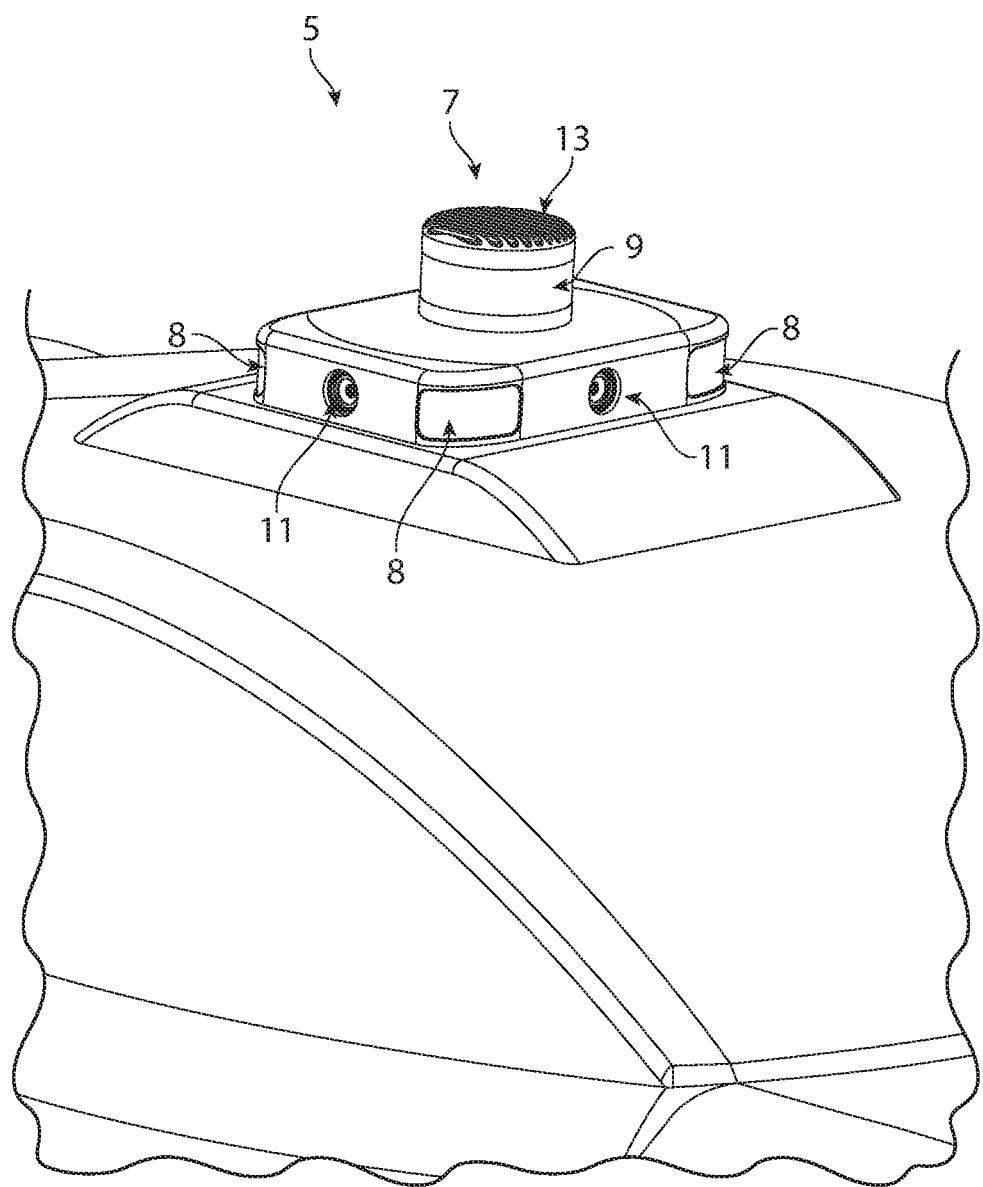
FIG. 2 illustrates a perspective view of a top side, a front side and a passenger side of a detection system, according to some embodiments.
Figure 3:
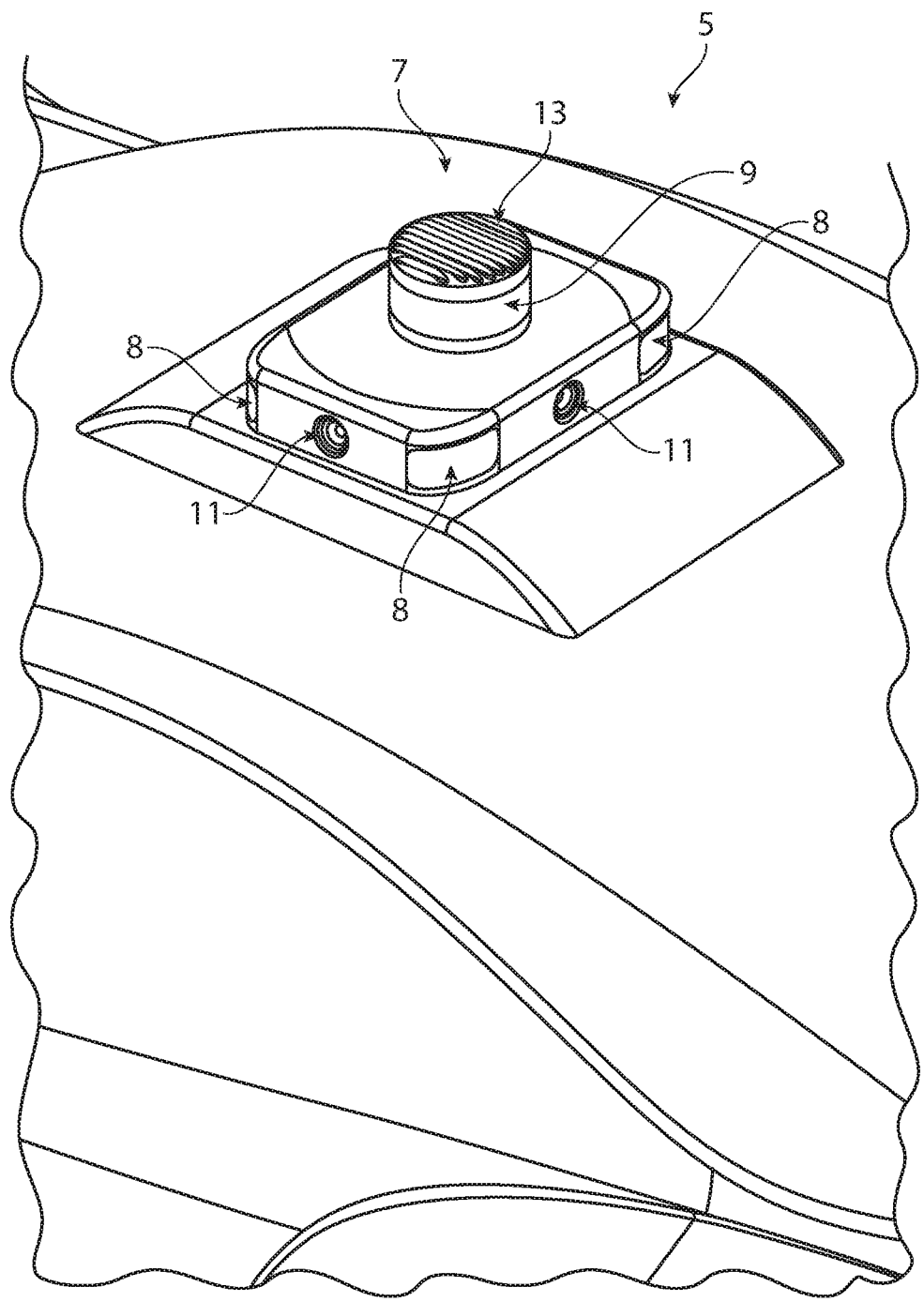
FIG. 3 illustrates a perspective view of the top side, a backside side and a driver side of the detection system, according to some embodiments.
Figure 4:
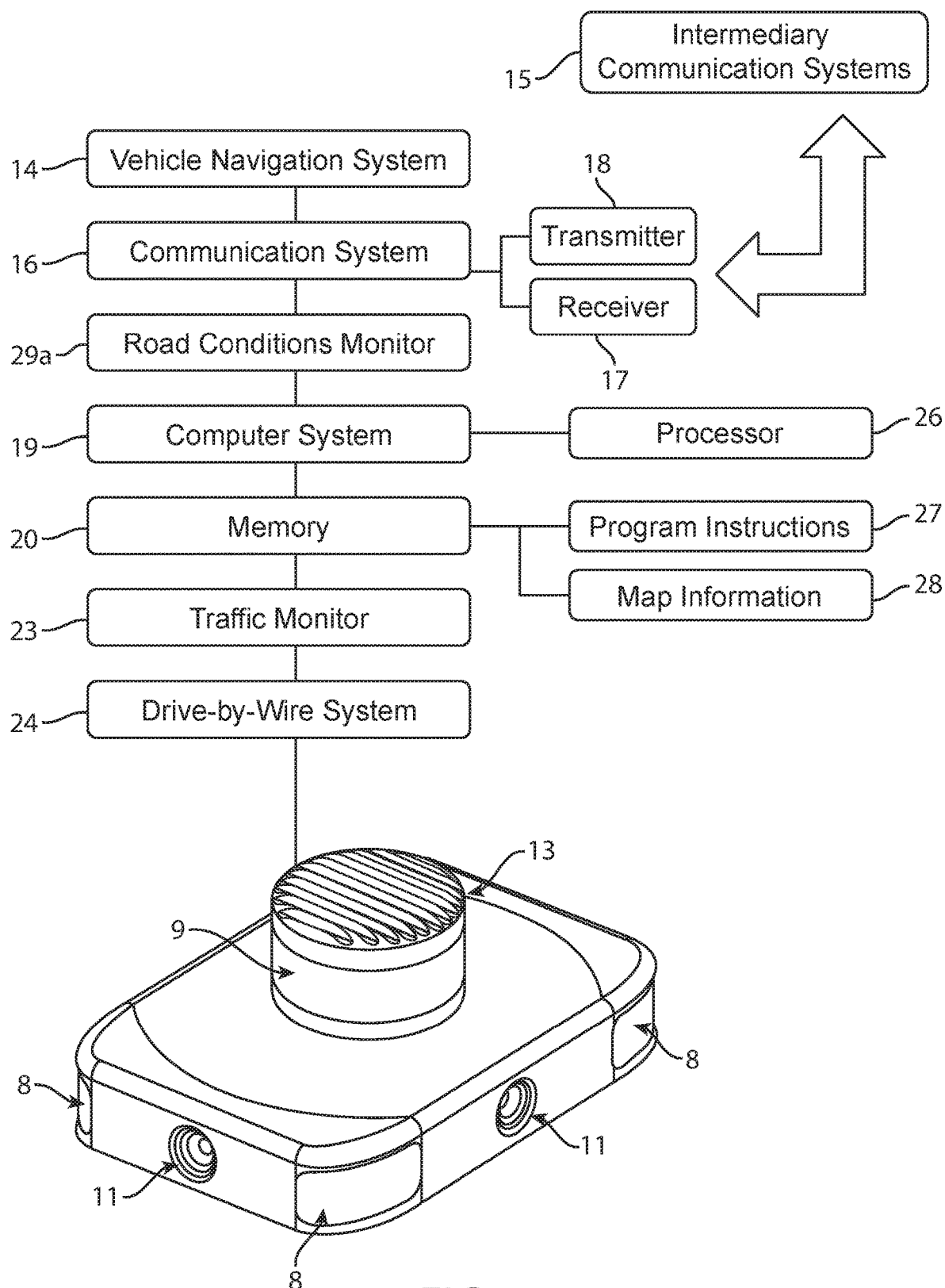
FIG. 4 illustrates a diagrammatic view of portions of a self-driving vehicle, according to some embodiments.

FIG. 2 illustrates a perspective view of the top side, the front side and the passenger side of the detection system 7. FIG. 3 illustrates a perspective view of the top side, the backside side and the driver side of the detection system 7. FIG. 4 illustrates a diagrammatic view of portions of a self-driving vehicle 5, according to some embodiments.

The detection system 7 can comprise radar 8, lidar 9, ultrasonic sensors 73, cameras 11, and any other sensing devices configured to enable the vehicle 5 to detect objects.

The self-driving vehicle 5 illustrated in FIGS. 1-4 includes a detection system 7 mounted to the roof of the self-driving vehicle 5. In some embodiments, however, the components of the detection system 7 are mounted on different areas of the self-driving vehicle 5. For example, the ultrasonic sensors 73 can be mounted on the bumpers of the self-driving vehicle 5. The short range of the ultrasonic sensors 73 can make bumper mounting helpful (because the bumper is often closer to the objects being sensed). The cameras 11 can be mounted just behind the windshield (e.g., in the rearview mirror) and just behind other windows. The radars 8 can be mounted near each of the four corners of the self-driving vehicle 5. In the illustrated embodiment, however, the detection system 7 can be contained in one assembly to simplify the integration of the detection system 7 into a vehicle.

The detection system 7 can use cameras 11 mounted around a perimeter (e.g., around a perimeter of the vehicle 5 or around a perimeter of a housing of the detection system 7). As illustrated in FIGS. 1-4, the cameras 11 face forward, backward, left, and right to provide (collectively) a 360-degree view around the vehicle 5. The cameras 11 can be high-resolution cameras covered by a glass window to protect each cameras 11 from water and dirt.

Cameras 11 can be configured to see lane markers on a road. Using cameras 11 to see painted lane markers can be helpful (because painted lane markers sometimes lack enough three dimensional nature to be detected by some other sensors). In addition, cameras 11 can see color differences (e.g., the difference between the color of the asphalt and the color of yellow or white paint of a lane marker). Cameras 11 can see the color of traffic lights (e.g., red, yellow, green).

Cameras 11 sometimes have trouble seeing in situations where the human eye would have trouble seeing (e.g., in fog or rain).

Radars 8 can be very helpful in fog and rain. An object that is not detected by cameras 11 (e.g., due to fog or rain) can be detected by radar 8. Radars 8 can detect the speed of other vehicles and the distance to other vehicles. Radars 8 can also detect objects that are far away.

Radar is an object-detection system that uses radio waves to determine the range, angle, or velocity of objects. A radar can comprise a transmitter producing electromagnetic waves in the radio or microwave domain, a transmitting antenna, a receiving antenna (which can be the same antenna as the transmitting antenna), a receiver, and/or a processor to determine properties of the objects detected by the radar.

Lidar uses light to detect objects. A lidar 9 can be located on a top portion of the detection system 7 to provide a 360-degree view of the area around the self-driving vehicle 5. The lidar 9 can tell the difference between an actual person and a billboard that includes a picture of a person (due to the three dimensional nature of the actual person and the two dimensional nature of the picture of a person).

The lidar 9 can accurately sense the three dimensional nature of the world around the self-driving vehicle 5. The lidar 9 can also measure the distance to objects. Measuring distance can enable the self-driving vehicle 5 to know, for example, if an approaching car is 5 meters away (so there is not enough time to turn in front of the car) or 25 meters away (so there may be enough time to turn in front of the car).

In some embodiments, the lidar 9 is a Velodyne VLS-128 made by Velodyne LiDAR, Inc. having an office in San Jose, Calif. The Velodyne VLS-128 can provide real-time, three-dimensional data with up to 0.1 degree vertical and horizontal resolution, a range of up to 300 meters, and a 360-degree surround view. The VLS-128 can provide the range, resolution and accuracy required by some of the most advanced autonomous vehicle programs in the world.

Many types of lidars can be used. Some embodiments use "incoherent" or direct energy detection (which principally measures amplitude changes of the reflected light). Some embodiments use coherent detection (which in some cases can be well suited for measuring Doppler shifts, or changes in phase of the reflected light). Coherent systems can use optical heterodyne detection.

Lidar can use pulse models. Some lidar embodiments use micropulse or high energy systems. Micropulse systems can use intermittent bursts of energy. Some lidar embodiments use high-power systems.

Lidar can comprise lasers. Some embodiments include solid-state lasers. Some embodiments include flash lidar. Some embodiments include electromechanical lidar. Some embodiments include phased arrays to illuminate any direction by using a microscopic array of individual antennas. Some embodiments include mirrors (e.g., micro electromechanical mirrors). Some embodiments include dual oscillating plane mirrors, a polygon mirror and/or a scanner (e.g., a dual-axis scanner).

Lidar embodiments can include photodetector and receiver electronics. Any suitable type of photodetector can be used. Some embodiments include solid-state photodetectors (e.g., silicon avalanche photodiodes) and/or photomultipliers.

The motion of the vehicle 5 can be compensated for to accurately determine the location, speed, and direction of objects (such as other vehicles) located outside the vehicle 5. For example, if a vehicle 5a is heading west at 35 miles per hour and a second vehicle is heading east at an unknown speed, a detection system 7a of the vehicle 5a can remove the contribution of the 35 miles per hour when determining the speed of the second vehicle.

In some embodiments, motion of the vehicle 5 is compensated for by using position and navigation systems to determine the absolute position, speed, and orientation of the lidar, camera, radar, or other object sensing system. A Global Positioning System ("GPS") receiver and/or an Inertial Measurement Unit ("IMU") can be used to determine the absolute position and orientation of the object sensing system.

Lidar can use active sensors that supply their own illumination source. The energy can hit objects. The reflected energy can be detected and measured by sensors. Distance to the object can be determined by recording the time between transmitted and backscattered pulses and by using the speed of light to calculate the distance traveled. Scanning can be used to create a three dimensional image or map of the area around the vehicle 5.

Embodiments can use a short-range lidar to give the self-driving vehicle 5 a surround view near the self-driving vehicle 5 (to see objects close to the self-driving vehicle 5) and can use a long-range lidar configured to not only detect objects located far from the self-driving vehicle 5, but also to enable zooming into objects that are over 200 meters away. The long-range lidar can be very helpful at high-speed highway situations.

Lidar uses light to detect a distance to an object, a direction to the object, and/or a location of an object. Lidar can use pulsed laser light emitted by a laser.

The light can reflect off objects around the vehicle. These reflections can be detected by a sensor of the lidar. Measuring how long the light takes to return to the sensor and measuring the wavelengths of the reflected light can enable making a three-dimensional model of the object being sensed and of the entire area around the vehicle 5.

FIG. 4 illustrates a diagrammatic view of portions of a self-driving vehicle 5, according to some embodiments. The self-driving vehicle 5 can include a vehicle navigation system 14, a communication system 16 that has a transmitter 18 and a receiver 17, a computer system 19 that has a processor 26, a memory 20 that has program instructions 27 and map information 28, a traffic monitor 23, and a drive-by-wire system 24. In some embodiments, at least some of these items are part of the detection system 7.

The vehicle navigation system 14 can be configured to enable the vehicle 5 to follow a driving route. The vehicle navigation system 14 can direct the vehicle toward a pick-up location.

The communication system 16 can be configured to communicate with a vehicle management system. The communication system 16 can be configured to communicate with a remote computing device 12 of a rider. The communication system 16 can use an antenna 13 to communicate with other vehicles and other devices (such as a vehicle management system and remote computing devices) via intermediary communication systems 15.

Intermediary communication systems 15 can comprise wireless networks, Wi-Fi routers, Bluetooth systems, cellular networks, telephone networks, Internet systems, servers, cloud computing, remotely located computers, satellite systems, communication systems, and any other suitable means of enabling communication between the various components of embodiments described herein and/or incorporated by reference.

The drive-by-wire system 24 can be a computer-regulated system for controlling the engine, accelerating, braking, steering, signaling, handling, suspension, and/or other functions related to autonomously driving the vehicle 5.

In some embodiments, at least portions of a vehicle management system are located far away from vehicles 5, 5a, 5b, 5c. The vehicle management system can include software that is run on servers. The servers can communicate with vehicles 5, 5a, 5b, 5c via intermediary communication systems 15.

In some embodiments, portions of the vehicle management system are located in one or more vehicles 5, 5a, 5b, 5c and portions of the vehicle management system are located far away from the one or more vehicles 5, 5a, 5b, 5c.

Figure 5:
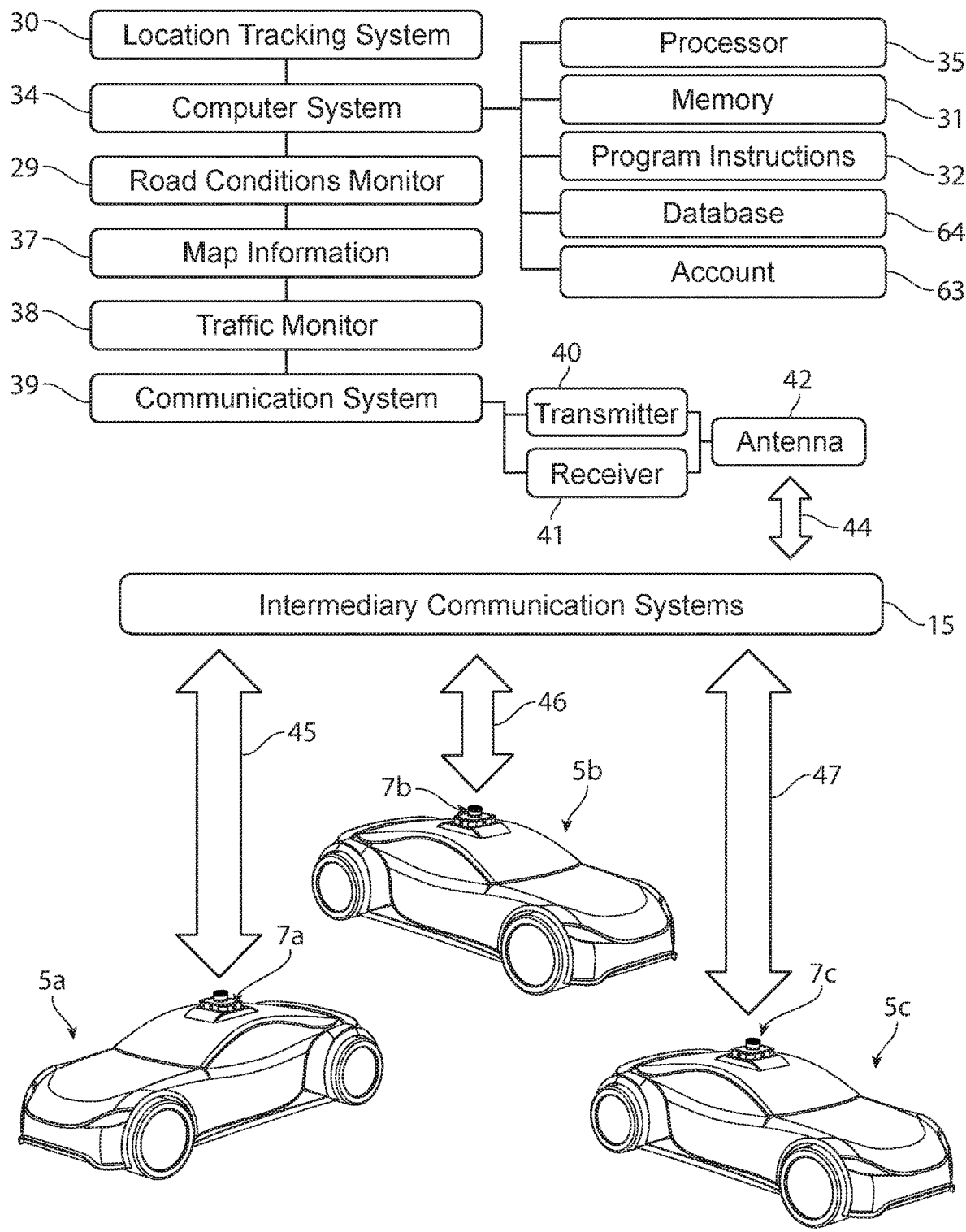
FIG. 5 illustrates a diagrammatic view of portions of a system, according to some embodiments.

FIG. 5 illustrates a diagrammatic view of portions of a vehicle management system, according to some embodiments. FIG. 5 illustrates many optional items. Not all the items illustrated in FIG. 5 are necessarily part of each vehicle management system.

A vehicle management system can comprise a location tracking system 30 configured to track locations of vehicles 5, 5a, 5b, 5c and also configured to track locations of vehicles 48 that have been identified as potentially impaired (according to indications collected by the vehicles 5, 5a, 5b, 5c).

The location tracking system 30 can receive GPS location data of the vehicles 5, 5a, 5b, 5c by the vehicles 5, 5a, 5b, 5c sending their GPS location data to the location tracking system 30 via intermediary communication systems 15.

The vehicles 5, 5a, 5b, 5c can receive radio communications from GPS satellites. These radio communications can include information configured to enable the vehicles 5, 5a, 5b, 5c to calculate their position at any time.

Receiving radio communications (with position data) from three or more GPS satellites can provide data to enable each vehicle and each remote computing device to calculate its own position. Then each vehicle and each remote computing device can send its position data to a vehicle management system (e.g., via intermediary communication systems 15).

Each device can receive radio signals broadcasted from GPS satellites. Then, the device can calculate how far it is away from the broadcasting satellite by determining how long the radio signal (traveling at light speed) took to arrive at the device. Trilateration (based on data from at least three GPS satellites) enables the device to know where it is located. The device can then send its location to the vehicle management system. A location tracking system can receive the location data from the vehicle management system, from the device, and/or from any other system.

The location tracking system 30 can comprise a computer configured to receive locations of vehicles and remote computing devices. The location tracking system 30 can comprise a processor 35 and a memory 31 comprising program instructions 32 configured such that when executed by the processor 35 the program instructions 32 cause the location tracking system 30 to monitor locations of vehicles and remote computing devices.

A vehicle management system can comprise a computer system 34 that includes one or more computers of any suitable type. Each computer can include a processor 35 and a memory 31 comprising program instructions 32 configured such that when executed by the processor 35 the program instructions 32 cause the vehicle management system to perform the methods described herein. The computer system 34 can comprise a database 64 having information.

The vehicle management system can comprise map information 37 (including street information, preferred pick-up locations, and preferred drop-off locations) and a traffic monitor 38 configured to receive traffic information from third parties (e.g., Google Maps).

The vehicle management system can comprise a communication system 39 having a transmitter 40, a receiver 41, and an antenna 42. The communication system 39 can be configured to communicate with the vehicles 5, 5a, 5b, 5c. In some embodiments, the communication system 39 communicates with the vehicles 5, 5a, 5b, 5c via intermediary communication systems 15. The antenna 42 can be communicatively coupled to the antenna 13 shown in FIG. 4.

The antenna 42 can send wireless communications to vehicles 5a, 5b, 5c via intermediary communication systems 15 (e.g., as indicated by arrows 44, 45, 46, 47). The antenna 42 can receive wireless communications from vehicles 5a, 5b, 5c via intermediary communication systems 15 (e.g., as indicated by arrows 44, 45, 46, 47).

The antenna 42 can be communicatively coupled (e.g., via intermediary communication systems 15) with self-driving vehicles 5, 5a, 5b, 5c that can include a vehicle navigation system 14, a communication system 16 that has a transmitter 18 and a receiver 17, a computer system 19 that has a processor 26, a memory 20 that has program instructions 27 and map information 28, a traffic monitor 23, and a drive-by-wire system 24 (as illustrated in FIG. 4).

Communicative coupling may be via continuous communications or intermittent communications. Intermittent communications can be via periodic communications (e.g., every 1 second, every 60 seconds, every 10 minutes). As used herein, "periodically" does not imply that every period has the same duration. In some embodiments, the communicative coupling is via intermediary communication systems 15.

Each self-driving vehicle 5a, 5b, 5c can include all of the items described in the context of vehicle 5.

Vehicle 5a includes a detection system 7a that can include all of the items described in the context of detection system 7. Vehicle 5b includes a detection system 7b that can include all of the items described in the context of detection system 7. Vehicle 5c includes a detection system 7c that can include all of the items described in the context of detection system 7.

Figure 6:
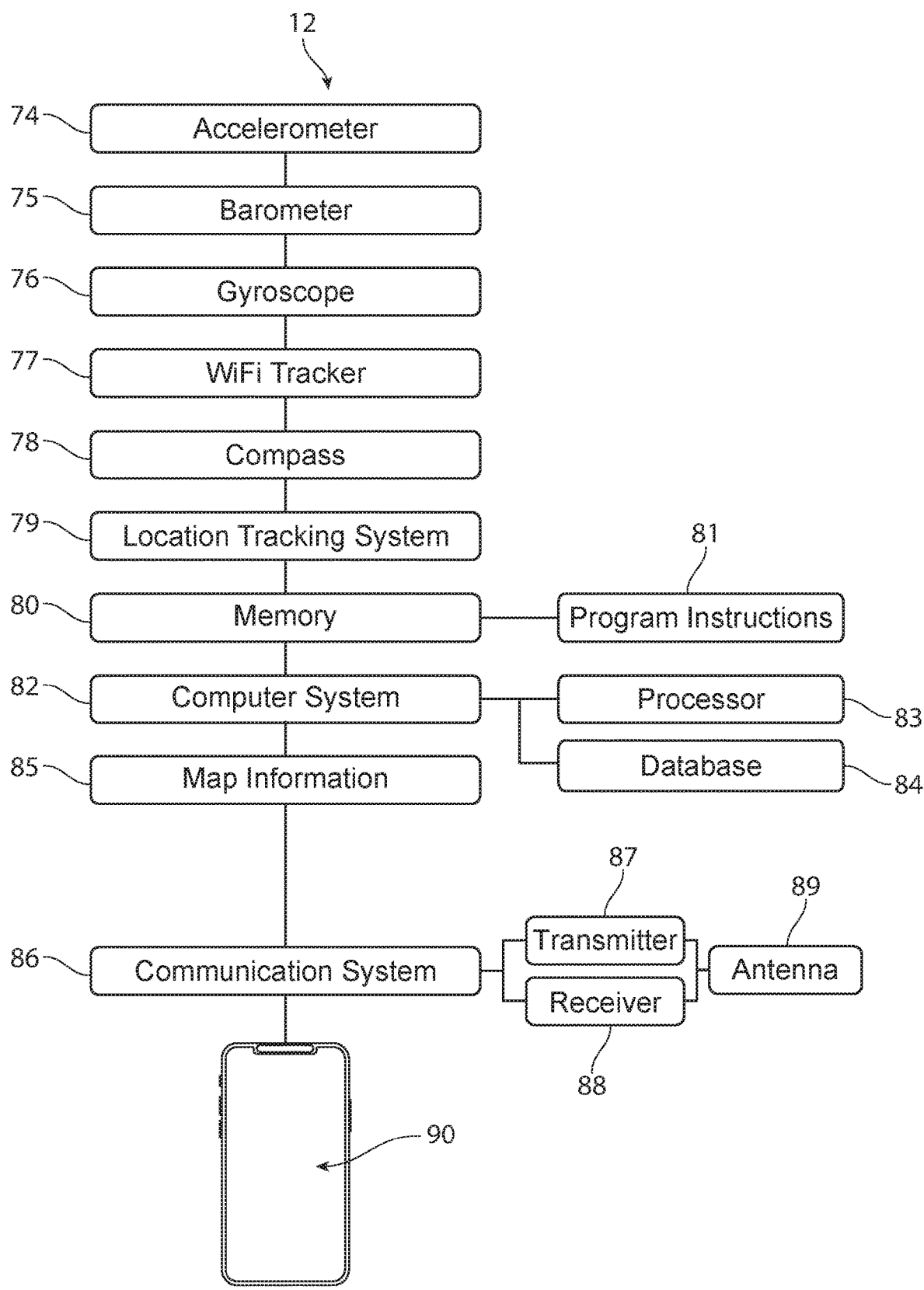
FIG. 6 illustrates a diagrammatic view of a remote computing device, according to some embodiments.

FIG. 6 illustrates a diagrammatic view of a remote computing device 12. Many different types of remote computing devices can be used with the embodiments described herein and/or incorporated by reference. Some remote computing devices do not include all the parts illustrated in FIG. 6. Some remote computing devices include parts not illustrated in FIG. 6.

A remote computing device can be a smartphone, a smartwatch, a tablet computer, a laptop computer, a desktop computer, a server, augmented reality glasses, an implanted computer, and/or any type of computer. A rider can bring her remote computing device into the self-driving vehicle, use her remote computing device in the self-driving vehicle, and leave the self-driving vehicle with her remote computing device. In some embodiments, the rider requests a ride at her home with a remote computing device, but then leaves the remote computing device at home when she goes to get a ride from the self-driving vehicle.

The remote computing device 12 can comprise an accelerometer 74, a barometer 75 (which can include an altimeter), a gyroscope 76, a WiFi tracker 77, a compass 78, a location tracking system 79, a memory 80, a computer system 82 having a processor 83, a database 84 and/or a communication system 86. The communication system can include a transmitter 87, a receiver 88, and/or an antenna 89. The remote computing device 12 can comprise a display screen 90 configured to display images to a rider. The remote computing device 12 can comprise a speaker configured to emit sounds to the rider. The remote computing device 12 can comprise a microphone configured to record sounds from the rider.

The remote computing device 12 can comprise map information 85 (including street information, preferred pick-up locations, and preferred drop-off locations). The map information 85 can be based on information from third parties (e.g., Google Maps).

The remote computing device 12 can comprise program instructions 81 configured to be executed by the processor 83.

Self-driving vehicles can include cars, vans, trucks, trains, boats, buses, scooters, motorcycles, helicopters, quadcopters, flying machines, air taxis, planes, and any motorized vehicle configured to transport a person.

A person (i.e., a rider) can enter (and/or ride on) a first self-driving vehicle 5a or a second self-driving vehicle 5b. Whichever vehicle the rider enters can transport the rider to a drop-off location.

In some cases, the first self-driving vehicle 5a transports the rider to the drop-off location and the second self-driving vehicle 5b picks up the rider. A self-driving vehicle fleet can comprise one vehicle, two vehicles, three vehicles or more vehicles. In some embodiments, a self-driving vehicle fleet comprises hundreds or even thousands of vehicles. The vehicles can coordinate to provide efficient transportation to the rider (and/or to many riders).

The first self-driving vehicle 5a can receive communications (e.g., radio signals) from positioning systems (which in some embodiments are GPS satellites). The second self-driving vehicle 5b can receive communications (e.g., radio signals) from positioning systems (which in some embodiments are GPS satellites).

Positioning systems (e.g., GPS satellites) can send communications (e.g., radio signals) to the first self-driving vehicle 5a. The first self-driving vehicle 5a can use these communications to determine positions of the first self-driving vehicle 5a at various times (e.g., when the first self-driving vehicle 5a drops off the rider at a drop-off location).

The first self-driving vehicle 5a can send communications (which can include GPS coordinates of the first self-driving vehicle 5a) to an antenna 42 via intermediary communication systems 15. Intermediary communication systems 15 can send communications (which can include GPS coordinates of the first self-driving vehicle 5a) to the antenna 42.

Receiving radio communications (with position data) from three or more GPS satellites can provide data to enable each vehicle 5a, 5b, 5c and each remote computing device 12 (shown in FIG. 6) to calculate its own position. Then each vehicle 5a, 5b, 5c and each remote computing device 12 can send its position data to a vehicle management system (e.g., via intermediary communication systems).

The location tracking system 30 can receive GPS location data of the vehicles 5, 5a, 5b, 5c by the vehicles 5, 5a, 5b, 5c sending their GPS location data to the location tracking system 30 via intermediary communication systems 15.

The vehicles 5, 5a, 5b, 5c can receive radio communications from GPS satellites. These radio communications can include information configured to enable the vehicles 5, 5a, 5b, 5c to calculate their position at any time.

Each device can receive radio signals broadcasted from GPS satellites. Then, the device can calculate how far it is away from the broadcasting satellite by determining how long the radio signal (traveling at light speed) took to arrive at the device. Trilateration (based on data from at least three GPS satellites) enables the device to know where it is located. The device can then send its location to the vehicle management system. A location tracking system 30 can receive the location data from the vehicle management system, from the device, and/or from any other system.

The location tracking system 30 can comprise a computer configured to receive locations of vehicles and remote computing devices. The location tracking system 30 can comprise a processor 35 and a memory 31 comprising program instructions 32 configured such that (when executed by the processor 35) the program instructions 32 cause the location tracking system 30 to monitor locations of vehicles 5, 5a, 5b, 5c and remote computing devices 12.

In some cases, a rider uses a remote computing device 12 to request a ride from the vehicle management system. Then, the vehicle management system prompts a self-driving vehicle 5 to drive to a pick-up location selected by the rider (e.g., via an "app" on the remote computing device 12).

A seat belt is a restraining device configured to hold a rider in a seat of a vehicle during a collision. Many different types of seat belts can be used with the embodiments described herein and/or incorporated by reference.

Seat belt embodiments can use two-point seat belts, lap seat belts, shoulder seat belts, sash seat belts, three-point seat belts, four-point seat belts, five-point seat belts, six-point seat belts, eight-point seat belts, and any other type of restraining device configured to hold a rider in a seat of a vehicle during a collision.

Figure 7:
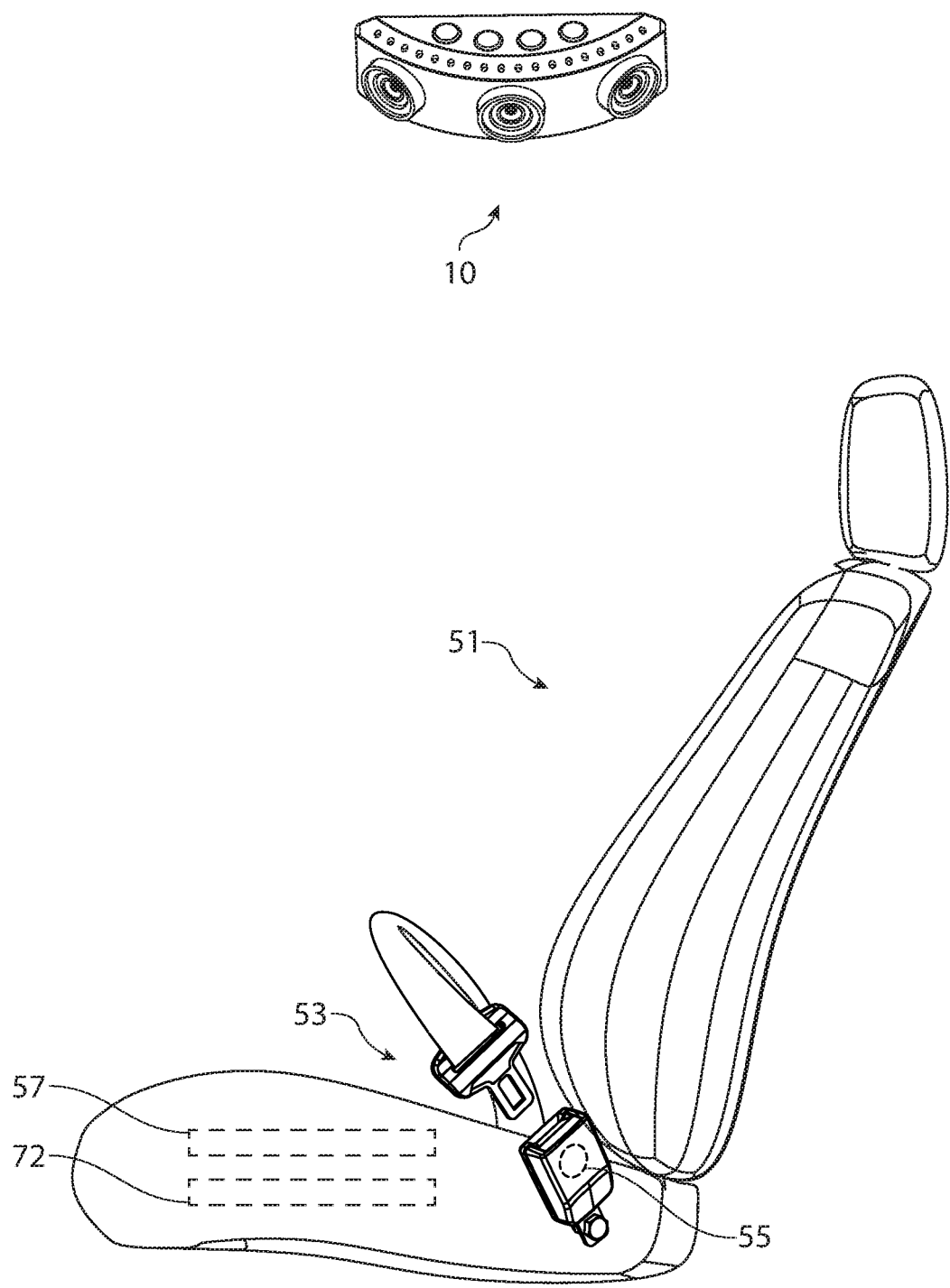
FIG. 7 illustrates a side view of a seat, according to some embodiments.

FIG. 7 illustrates a side view of a first seat 51. A camera device 10 is also shown in FIG. 7. The camera device 10 can be configured to detect if a rider is sitting in the first seat 51. An optional shoulder strap is hidden in FIG. 7.

Figure 9:
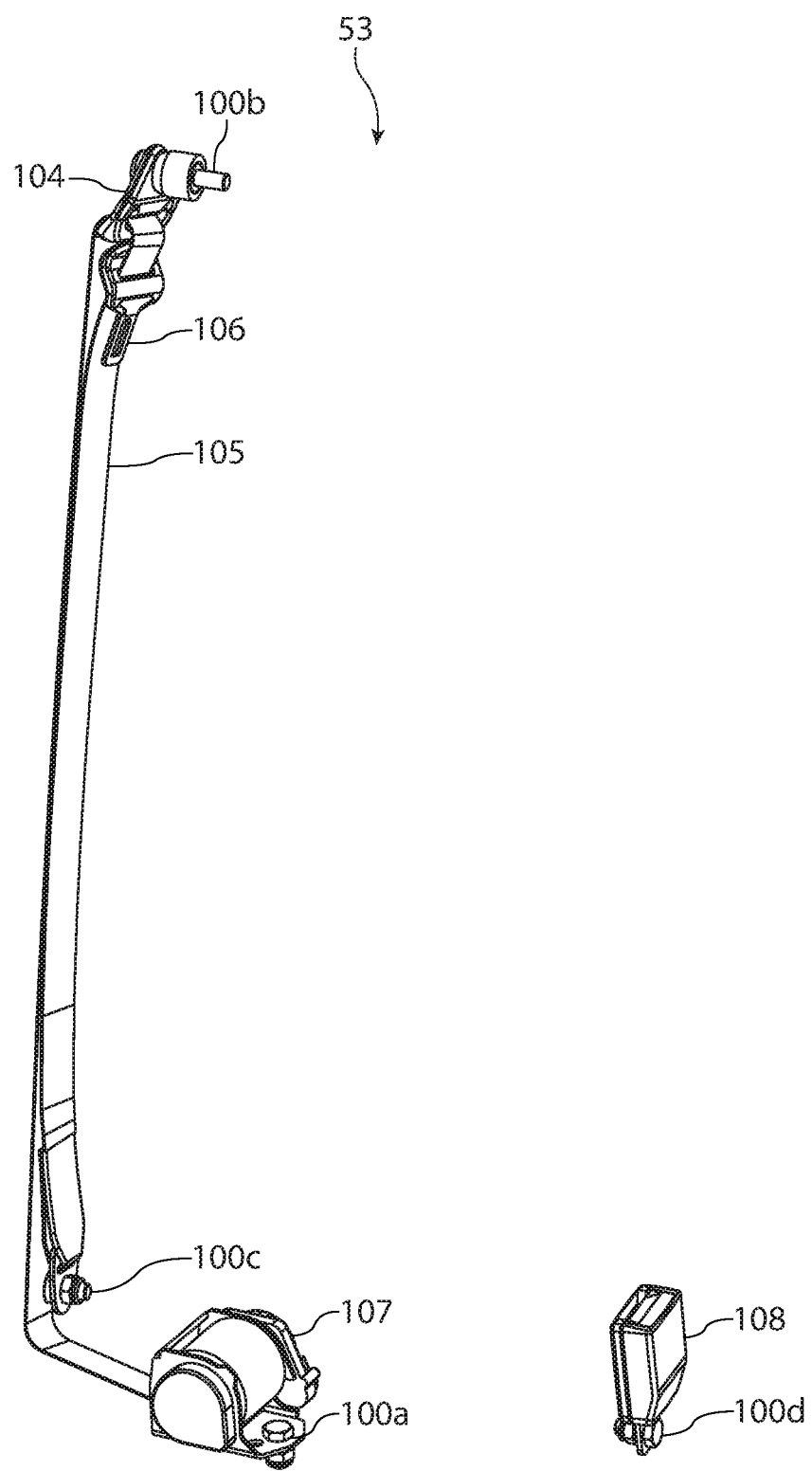
FIG. 9 illustrates a perspective view of a seat belt, according to some embodiments.

FIG. 9 illustrates a seat belt 53 having anchor points 100a, 100b, 100c, 100d that can be bolted to a frame of a self-driving vehicle 5. The seat belt 53 can comprise a strap 105. The strap 105 can include webbing. The strap 105 can be flexible. The strap 105 can be rigid. Many other types of seat belts can be used.

The seat belt 53 can include a retractor 107 that is spring loaded to apply a force to the strap 105 that wraps at least a portion of the seat belt 53 around a rotating portion of the retractor 107. Pulling the seat belt tongue 106 toward the buckle 108 can create a triangular shape that forms a shoulder belt and a lap belt as the strap 105 slides through the pillar loop 104.

Figure 10:
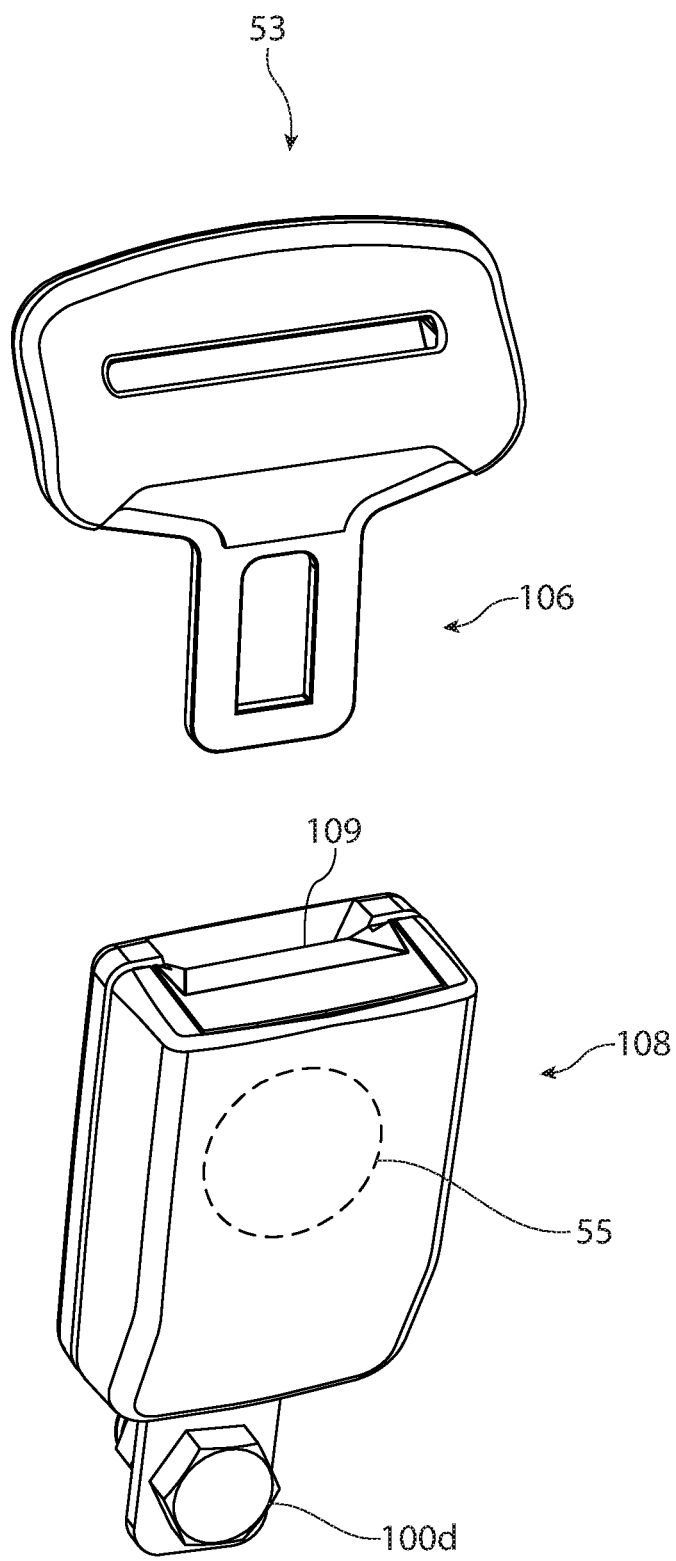
FIG. 10 illustrates a perspective view of portions of a seat belt, according to some embodiments.

FIG. 10 illustrates portions of the seat belt 53. Inserting the tongue 106 (which can be metal) into an opening 109 of the buckle 108 can "buckle" the seat belt 53.

A seat belt sensor 55 is configured to detect at least one of a buckled state of the first seat belt 53 and an unbuckled state of the first seat belt 53. In some embodiments, a seat belt sensor detects if a strap 105 is coupled to an anchor such that the seat belt is arranged to restrain a rider in the event of a collision. In some embodiments, a seat belt sensor detects if there is strain on the strap 105 (e.g., due to one end of the strap 105 being coupled to an anchor and another end of the strap 105 being pulled by a retractor 107) such that the seat belt is arranged to restrain a rider in the event of a collision. Many types of seat belt sensors can be used with the embodiments described herein and/or incorporated by reference.

U.S. Pat. No. 7,093,515 teaches a seat belt sensor to detect whether a seat belt is in a buckled state: "The buckle switch 17 is turned off when the seat belt 14 is fastened by inserting and thereby hooking a tongue 15 to a buckle 16. The buckle switch 17 is turned on when the tongue 15 is not inserted into and hooked on the buckle 16 and thus the seat belt 14 is unfastened." See FIG. 4 of U.S. Pat. No. 7,093,515. The entire contents of U.S. Pat. No. 7,093,515 are incorporated by reference herein.

U.S. Pat. Nos. 5,960,523; 6,554,318; and 5,871,063 teach about seat belt sensors. The entire contents of U.S. Pat. Nos. 5,960,523; 6,554,318; and 5,871,063 are incorporated by reference herein.

U.S. Pat. Nos. 5,965,827; 5,996,421; 5,765,774; 6,205,868; and 6,357,091 teach about seat belt sensors. The entire contents of U.S. Pat. Nos. 5,965,827; 5,996,421; 5,765,774; 6,205,868; and 6,357,091 are incorporated by reference herein.

In some embodiments, a seat belt sensor 55 comprises a switch that is triggered by inserting the tongue 106 into the opening 109 of the buckle 108. The switch can be a mechanical switch. The switch can be an electrical component configured to, for example, complete an electrical current in response to inserting the tongue 106 into the opening 109 of the buckle 108. Many different types of electrical switches can be used. Some embodiments use a reed switch. Some embodiments use a light switch configured such that inserting the tongue 106 into the opening 109 of the buckle 108 blocks light emitted from a light source (located inside the buckle 108) from reaching a light sensor (located inside the buckle 108). If the buckle sensor does not detect the light from the light source, then the system determines that the seat belt 53 is "buckled."

In some embodiments, the tongue 106 comprises a signal emitting portion and the buckle 108 comprises a signal receiving portion. If the buckle sensor does not detect the signal, then the system determines that the seat belt 53 is "unbuckled."

In some embodiments, the tongue 106 comprises a signal receiving portion and the buckle 108 comprises a signal emitting portion. If the buckle sensor does not detect the signal, then the system determines that the seat belt 53 is "unbuckled."

In some embodiments, the buckle sensor 55 is a strain gauge coupled to the strap 105 such that when the seat belt 53 is "buckled," the resulting strain is sensed by the buckle sensor 55 (such that the system can determine that the seat belt 53 is "buckled").

A seat belt sensor can be configured to detect at least one of a buckled state of a seat belt and an unbuckled state of first seat belt. As used herein, "buckled state" is used broadly to mean that the seat belt is arranged to help secure a rider if a collision occurs.

A seat belt may be extendable (e.g., the retractor 107 may allow additional strap length to unroll) but still may be arranged to help secure the rider if a collision occurs. For example, a seat belt arranged across a lap of a rider, across a chest and shoulder area of a rider, and/or across a frontside (e.g., of an upper body) of the rider is arranged to help secure a rider if a collision occurs.

As used herein, "unbuckled state" is used broadly to mean that the seat belt is not arranged to help secure a rider if a collision occurs. For example, if the seat belt is simply located at the side of the rider and the tongue 106 is not coupled to the buckle 108, then the seat belt is not arranged to help secure the rider if a collision occurs.

Some seat belts do not have a buckle but can still be placed in a "buckled state" if the seat belt is arranged to help secure a rider if a collision occurs. A seat belt (even without a buckle) can be positioned across a lap of a rider such that the seat belt is arranged to help secure a rider if a collision occurs.

Embodiments can use the terminology "uncoupled state" for a seat belt that is not arranged to help secure a rider if a collision occurs and "coupled state" for a seat belt that is arranged to help secure a rider if a collision occurs.

Embodiments can use the terminology "unfastened state" for a seat belt that is not arranged to help secure a rider if a collision occurs. Embodiments can use the terminology "fastened state" for a seat belt that is arranged to help secure a rider if a collision occurs.

Motorized seat belts can be placed in a buckled state via a motor that moves the seat belt into a position to help secure a rider if a collision occurs. The seat belt can begin in an unbuckled state that enables the rider to enter the vehicle and sit in the seat. Then, the motor can move the seat belt (e.g., along a track coupled to a frame of the vehicle) into a buckled state such that the seat belt is in a position to help secure the rider if a collision occurs. In some motorized seat belts, actuating a buckle is not necessary to transition from an unbuckled state to a buckled state because movement of an end of the seat belt along the track (rather than actuating the buckle) places the seat belt in a position to help secure a rider if a collision occurs. The entire contents of U.S. Pat. No. 4,995,640 are incorporated by reference herein.

In some embodiments, a seat-belt monitoring system comprises a first occupancy sensor 57 configured to detect the rider sitting in the first seat 51. Occupancy sensor embodiments can use any type of sensor that enables the seat-belt monitoring system to detect whether a rider is located in a seat. Many types of sensors can be used.

In some embodiments, an occupancy sensor comprises a camera (e.g., 10, 10a, 10b, 11a, 11b, 24a, 24b, 24c) configured to take a picture of the rider. A computer system (e.g., 34, 19, 19a, 82) can comprise program instructions (e.g., 32, 27, 27a, 81) configured to visually analyze the picture to determine if the picture shows a rider (a person) sitting in a seat (e.g., 51, 65, 52, 67). For example, Amazon Web Services, Inc. provides an application programming interface ("API") called "Amazon Rekognition" to automatically recognize people and objects in pictures. A communication system 16 of a self-driving vehicle 5a can send the picture to the API for analysis. The API can then tell a computer system (e.g., 34, 19, 82) if the picture shows a rider located in the seat of the vehicle. The API can also tell a computer system (e.g., 34, 19, 19a, 82) if the picture shows the seat belt in a buckled state or in an unbuckled state. Thus, the API can enable a camera-based system to serve as both an occupancy sensor (to determine if a person is sitting in the seat) and as a seat belt sensor configured to detect a buckled state of the seat belt and an unbuckled state of the seat belt.

In some embodiments, an occupancy sensor comprises a camera. U.S. Pat. No. 7,505,841 includes an occupancy sensor that comprises a camera. The entire contents of U.S. Pat. No. 7,505,841 are incorporated by reference herein. U.S. Pat. No. 7,415,126 includes an occupancy sensor that comprises a camera. The entire contents of U.S. Pat. No. 7,415,126 are incorporated by reference herein.

In some embodiments, an occupancy sensor comprises a pressure sensor configured to detect whether a rider is sitting in a seat of a vehicle. The pressure sensor can collect data indicative of a rider's weight. The rider likely has her feet on the floor, so the weight data may not reflect the rider's entire weight. Even so, the weight data can help identify the rider. For example, a first rider may have a weight of 120 pounds with 30 pounds resting on the floor (due to the first rider's feet being on the floor) and 90 pounds resting on a first seat. The distribution between the first rider's weight on the floor and weight on the first seat may vary (e.g., by plus or minus fifteen percent) depending on how the first rider is sitting on the first seat, but generally is fairly consistent.

A second rider may have a weight of 200 pounds with 50 pounds resting on the floor (due to the second rider's feet being on the floor) and 150 pounds resting on a second seat. The distribution between the second rider's weight on the floor and weight on the second seat may vary (e.g., by plus or minus fifteen percent) depending on how the second rider is sitting on the second seat, but generally is fairly consistent.

Program instructions can be configured to use the weight on the seat (and/or on the floor) to help identify which rider is sitting in a particular seat. For example, the first rider may travel in four vehicles on four different days with recorded weights (e.g., in seats of each vehicle) of 90+/−8 pounds, 92+/−7 pounds, 91+/−8 pounds, and 89+/−7 pounds. The second rider may travel in four vehicles on four different days with recorded weights (e.g., in seats of each vehicle) of 150+/−9 pounds, 148+/−7 pounds, 148+/−5 pounds, and 151+/−8 pounds.

If the first and second riders are located in a vehicle, the program instructions can be configured to use the weight history data of the first and second riders to determine which rider is located in a particular seat. For example, "seat A" may detect a weight of 92 pounds and "seat B" may detect a weight of 148 pounds. The computer system can then compare the detected weights to a weight history in a profile of each rider to determine that the first rider is located in "seat A" and the second rider is located in "seat B." If a seat belt sensor of "seat B" detects an unbuckled state, the program instructions can be configured to fine an account of the second rider (rather than mistakenly fining an account of the first rider).

A weight (e.g., detected by an occupancy sensor) over a predetermined threshold can be used to enable the system to determine that the weight is due to a person rather than another object such as a laptop, a backpack, or a grocery bag. In some embodiments, the predetermined threshold is greater than 20 pounds, greater than 30 pounds, less than 50 pounds, and/or less than 70 pounds.

U.S. Pat. No. 6,609,054 includes occupancy sensor information. The entire contents of U.S. Pat. No. 6,609,054 are incorporated by reference herein.

U.S. Pat. No. 6,918,612 includes occupancy sensor information. The entire contents of U.S. Pat. No. 6,918,612 are incorporated by reference herein.

U.S. Pat. No. 6,927,678 includes occupancy sensor information. The entire contents of U.S. Pat. No. 6,927,678 are incorporated by reference herein.

U.S. Pat. No. 6,920,256 includes occupancy sensor information. The entire contents of U.S. Pat. No. 6,920,256 are incorporated by reference herein. Occupancy sensor systems can use effects of a presence of a rider sitting in a seat to detect whether a rider is sitting in a seat. In some embodiments, light from a light source is blocked by the rider sitting on a seat. The blocked light is not detected by a light sensor. Failing to detect the light is a signal that a rider is sitting in the seat.

In some embodiments, an occupancy sensor comprises a weight sensor 72. U.S. Pat. No. 6,636,792 includes weight sensor information. The entire contents of U.S. Pat. No. 6,636,792 are incorporated by reference herein.

Figure 12:
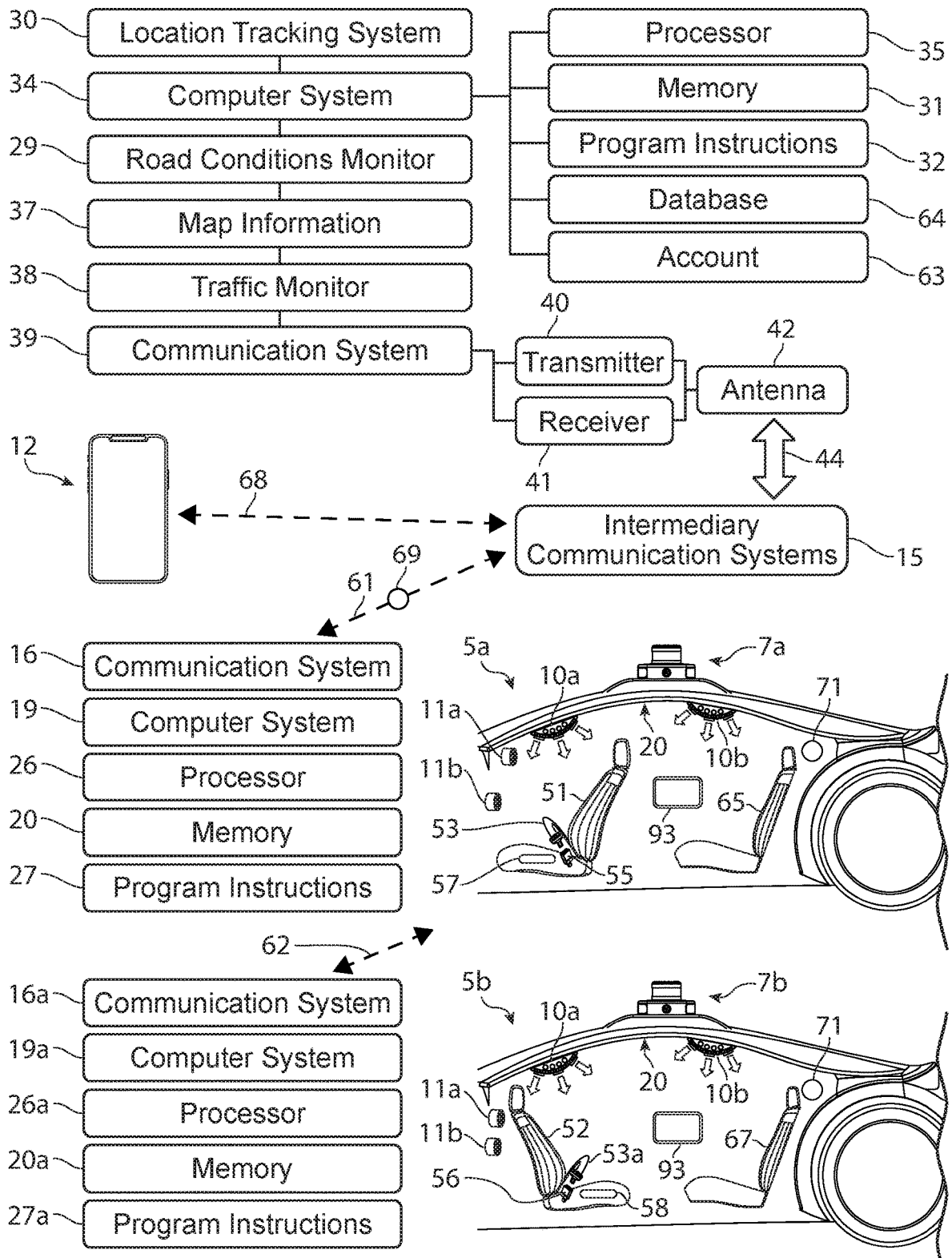
FIG. 12 illustrates a diagrammatic view of a system, according to some embodiments.

Referring now primarily to FIG. 12, a seat-belt monitoring system can comprise a first self-driving vehicle 5a configured to transport a rider (a person); a first seat 51 coupled to the first self-driving vehicle 5a; a first seat belt 53 configured to secure the rider in the first seat 51; and/or a first seat belt sensor 55 configured to detect at least one of a buckled state of the first seat belt 53 and an unbuckled state of the first seat belt 53.

The first self-driving vehicle 5a can comprise a communication system 16, a computer system 19, a processor 26, a memory 20, program instructions 27, and seats 51, 65. A seat-belt monitoring system can comprise a second self-driving vehicle 5b configured to transport a rider. The second self-driving vehicle 5b can comprise a communication system 16a, a computer system 19a, a processor 26a, a memory 20a, program instructions 27a, and seats 52, 67.

In some embodiments, a seat-belt monitoring system comprises a first occupancy sensor 57 configured to detect the rider sitting in the first seat 51; and/or a computer system 34 comprising at least one computer and located remotely relative to the first self-driving vehicle 5a.

In some embodiments, a computer system (e.g., 34, 19, 19a, 82, other computer systems) comprises a processor and a memory having program instructions that when executed by the processor are configured to execute any of the steps described herein.

In some embodiments, a computer system 34 comprises a processor 35 and a memory 31 having program instructions 32 that when executed by the processor 35 are configured to execute any of the steps described herein.

In some embodiments, a first self-driving vehicle 5a comprises a computer system 19 having a processor 26 and a memory 20. The memory 20 can comprise program instructions 27 that when executed by the processor 26 are configured to execute any of the steps described herein.

In some embodiments, a second self-driving vehicle 5b comprises a computer system 19a having a processor 26a and a memory 20a. The memory 20a can comprise program instructions 27a that when executed by the processor 26a are configured to execute any of the steps described herein.

In some embodiments, a first self-driving vehicle 5a comprises a computer system 19 having a processor 26 and a memory 20. The memory 20 can comprise program instructions 27 (e.g., of the first self-driving vehicle 5a) that when executed by the processor 26 are configured to send a first wireless communication 61 to another computer system (e.g., 34) located remotely relative to the first self-driving vehicle 5a.

A communication system 16 of the first self-driving vehicle 5a can send the first wireless communication 61 via an antenna 13, intermediary communication systems 15, an antenna 42, and/or a communication system 39 to the remotely located computer system 34. The computer system 34 can be located remotely relative to the first self-driving vehicle 5a by not being mechanically coupled to the first self-driving vehicle 5a.

In some embodiments, the computer system 34 is located in the "cloud." The computer system 34 can comprise servers configured to operate the program instructions 32 to control various aspects of a fleet of vehicles (e.g., 5a, 5b, 5c). The fleet of vehicles can include one vehicle, hundreds of vehicles, thousands of vehicles, and/or even more vehicles.

The vehicles 5a, 5b, 5c can include any of the features described in the context of vehicle 5. To reduce unnecessary redundancy, some of the features of vehicle 5 are not described again in the context of vehicles 5a, 5b, 5c.

In some embodiments, the first self-driving vehicle 5a comprises first program instructions 27 configured to send a first wireless communication 61 to a remotely located computer system 34 in response to the first occupancy sensor 57 detecting the rider sitting in the first seat 51 and in response to the first seat belt sensor 55 detecting the unbuckled state.

Sending the first wireless communication 61 in response to both the first occupancy sensor 57 detecting the rider sitting in the first seat 51 and the first seat belt sensor 55 detecting the unbuckled state can reduce the risk of falsely reporting that a rider is unbuckled when really the first seat belt sensor 55 detected an unbuckled state simply because no one is sitting in the first seat 51.

The first wireless communication 61 can comprise several communication sessions. In other words, the data communicated by the first wireless communication 61 does not necessarily have to be sent in a single communication. In some embodiments, the data communicated by the first wireless communication 61 is split into several communication sessions, which together form the first wireless communication 61.

The remote computing device 12 of the rider can be used to notify the rider about seat belt related information. For example, a display screen 90 of the remote computing device 12 can display a message to prompt the rider to place the first seat belt 53 in a buckled state. Many types of messages can be used to prompt the rider. For example, the following message can be displayed on the screen 90: "Please fasten your seat belt to avoid a fine, to avoid restrictions on future transportation privileges, and to avoid injury due to hazardous conditions."

In some embodiments, a computer system 34 comprises second program instructions 32 configured to send a second wireless communication 68 to a remote computing device 12 of the rider in response to the computer system 34 receiving the first wireless communication 61. The second wireless communication 68 can be configured to prompt the rider to place the first seat belt 53 in the buckled state. The second wireless communication 68 can be configured to warn the rider of a fine for the unbuckled state of the first seat belt 53.

In some embodiments, a computer system 34 comprises a memory 31 having a buckling history of the rider. The buckling history can comprise data indicative of past buckling behavior of the rider prior to the rider entering the first self-driving vehicle 5a. The buckling history can comprise data indicative of buckling behavior of the rider while the rider is being transported by the first self-driving vehicle 5a.

An embodiment of a buckling history of "Rider 1" can include the following information: Jun. 15, 2017—Unbuckled during at least a portion of ride 342,948; Jun. 16, 2017—Buckled during ride 343,217; Jun. 16, 2017—Buckled during ride 343,314; Jun. 19, 2017—Unbuckled during at least a portion of ride 345,152. Of course, many different types of buckling histories are possible in many diverse embodiments.

In some embodiments, the buckling history includes data regarding a date of a ride, instances of the rider being unbuckled while a vehicle was moving, instances of the rider being buckled while the vehicle was moving, warnings (including emails, text messages, and audible warnings emitted from a vehicle) given to the rider in response to the rider not being buckled, pictures of the rider while unbuckled, a record of fines given to the rider for not being buckled, etc.

The buckling history can be used as evidence of the rider's buckling behavior while being transported by many different vehicles (e.g., 5a, 5b, 5c). If a collision occurs, the buckling history can be used to show that the rider received multiple warnings to buckle up prior to the collision (e.g., in the minutes, weeks, or months prior to the collision).

A rider with a buckling history that indicates the rider has failed to fasten her seat belt in the past may receive higher transportation prices in the future or may be denied transportation in the future. A rider with a buckling history that indicates the rider has failed to fasten her seat belt in the past may receive a lower ride priority ranking in the future such that if demand for transportation exceeds the supply of vehicles to provide transportation, the system may decide to deny the rider's transportation request or make the rider wait longer (than a person with a more consistent history of fastening her seat belt).

A rider with a buckling history that indicates the rider has consistently fastened her seat belt in the past may receive lower transportation prices in the future. A rider with a buckling history that indicates the rider has consistently fastened her seat belt in the past may receive a higher ride priority ranking in the future.

A computer system can comprise a memory having data regarding a buckling history of the rider. Buckling history data can be used by program instructions to decide which rider's transportation request to fulfill first.

Buckling history data can be used by program instructions to decide insurance prices. A buckling history indicative of failing to fasten seat belts can result in higher insurance prices. A buckling history indicative of consistently fastening seat belts can result in lower insurance prices.

The computer system 34 can comprise second program instructions 32 configured to update the buckling history in response to receiving the first wireless communication 61. (In some embodiments, a computer system 19 comprises a memory 20 having a buckling history of the rider.)

In some embodiments, a computer system (e.g., 34, 19a) comprises second program instructions configured to deny a future ride request from the rider in response to the computer system receiving the first wireless communication 61.

In some embodiments, a computer system 34 comprises a memory 31 having a buckling history of the rider. The computer system 34 can comprise second program instructions 32 configured to update the buckling history of the rider in response to receiving the first wireless communication 61. The second program instructions 32 can be configured to deny a future ride request of the rider in response to the computer system 34 analyzing the buckling history. For example, if buckling compliance is below a predetermined threshold, second program instructions 32 can be configured to deny a future ride request of the rider.

In some embodiments, the computer system 34 comprises a memory 31 having a buckling history of the rider. The buckling history can be at least partially based on the first wireless communication 61 and/or another wireless communication 62 from a second self-driving vehicle 5b. The computer system 34 can comprise second program instructions 32 configured to determine a future ride price for the rider at least partially based on the buckling history. For example, if buckling compliance is below a predetermined threshold, second program instructions 32 can be configured to increase the future ride price (e.g., by at least 10 percent compared to a regular price that does not include buckling history consideration). For example, if buckling compliance is above a predetermined threshold, second program instructions 32 can be configured to decrease the future ride price (e.g., by at least 10 percent compared to a regular price that does not include buckling history consideration).

In some embodiments, the seat-belt monitoring system comprises a computer system 34 having at least one computer. The computer system 34 can be located remotely relative to the first self-driving vehicle 5a (e.g., the computer system 34 is not mechanically coupled to the first self-driving vehicle 5a). Even if the computer system 34 is not mechanically coupled to the first self-driving vehicle 5a, the computer system 34 may be communicatively coupled to the first self-driving vehicle 5a (e.g., via intermediary communication systems 15).

In some embodiments, the first self-driving vehicle 5a comprises first program instructions 27 configured to send a first wireless communication 61 to the computer system 34 in response to the first seat belt sensor 55 detecting the unbuckled state.

In some embodiments, the first self-driving vehicle 5a comprises a first processor 26 and a first memory 20 having first program instructions 27 that when executed by the first processor 26 are configured to send a first wireless communication 61 to the computer system 34 in response to both the first occupancy sensor 57 detecting the rider sitting in the first seat 51 and the first seat belt sensor 55 detecting the unbuckled state. Relying on both the first occupancy sensor 57 detecting the rider sitting in the first seat 51 and the first seat belt sensor 55 detecting the unbuckled state reduces occurrences of the system falsely determining that a rider is unbuckled (when in reality a seat belt sensor detects an unbuckled state simply because a rider is not sitting in the seat).

The system can impose financial penalties on a rider in response to the rider (or one of her passengers) failing to fasten her seat belt. The financial penalty may be a dollar amount charged to an account 63 of the rider. The account 63 may include credit card information of the rider such that the program instructions 32 can be configured to charge a credit card in response to the rider not fastening her seat belt. If an adult requests a ride and then enters the vehicle with a child, the adult may be charged in response to the child not fastening his seat belt.

In some embodiments, a computer system (e.g., 34) comprises program instructions (e.g., 32) configured to fine an account 63 of the rider in response to the computer system (e.g., 34) receiving a first communication (e.g., a first wireless communication 61).

In some embodiments, a computer system 34 comprises a processor 35 and a memory 31 having second program instructions 32 that when executed by the processor 35 are configured to fine an account 63 of the rider in response to the computer system 34 receiving the first wireless communication 61.

In some embodiments, the computer system 34 needs to know an identity of the rider in order to know which account to fine and/or penalize.

In some embodiments, the first wireless communication 61 comprises an identification of the rider. The identification can be configured to enable the second program instructions 32 to fine the account 63. For example, the first wireless communication may include an identification code (e.g., 3921078, G382HR) that indicates the identity of the rider. The database 64 can include a table that enables the computer system 34 to determine the name and credit card associated with the identification code.

Some embodiments use a picture of the rider as an identification of the rider. The computer system 34 can analyze the picture to determine an identity of the rider. Of course, many types of identifications can be used to enable the computer system 34 to identify the rider.

In some embodiments, the first wireless communication 61 comprises data configured to enable the computer system 34 to identify an account 63 of the rider. Identifying the account 63 of the rider can enable the system to fine the account 63 of the rider instead of mistakenly fining an account of another person.

In some embodiments, the seat-belt monitoring system comprises many self-driving vehicles. In some embodiments, the seat-belt monitoring system comprises a second self-driving vehicle 5b having a second seat 52, a second seat belt 53a and a second seat belt sensor 56. The second seat belt sensor 56 can be configured to detect at least one of a buckled state of the second seat belt 53a and an unbuckled state of the second seat belt 53a.

In some embodiments, the computer system 34 is located remotely relative to the first self-driving vehicle 5a and the second self-driving vehicle 5b. In some embodiments, the computer system 34 is not located remotely relative to the first self-driving vehicle 5a (and is mechanically coupled to the first self-driving vehicle 5a). In some embodiments, the computer system 34 is not located remotely relative to the second self-driving vehicle 5b (and is mechanically coupled to the second self-driving vehicle 5b).

In some embodiments, the computer system 34 comprises second program instructions 32. The second self-driving vehicle 5b can comprise third program instructions 27a configured to send a second wireless communication 62 to the computer system 34 (e.g., via intermediary communication systems 15) in response to the second seat belt sensor 56 detecting the unbuckled state of the second seat belt 53a.

The second self-driving vehicle 5b can comprise third program instructions 27a configured to send a second wireless communication 62 to the computer system 34 in response to both the second seat belt sensor 56 detecting the unbuckled state of the second seat belt 53a and a second occupancy sensor 58 detecting the rider sitting in the second seat 52 of the second self-driving vehicle 5b.

The second self-driving vehicle 5b can comprise a processor 26a and a memory 20a having program instructions 27a that when executed by the processor 26a are configured to send a wireless communication 62 to a computer system 34 and/or to a computer system 19 in response to the second seat belt sensor 56 detecting the unbuckled state.

A first self-driving vehicle 5a can send wireless communications to a second self-driving vehicle 5b. The second self-driving vehicle 5b can send wireless communications to the first self-driving vehicle 5a.

In some embodiments, a computer system (e.g., 34, 19, 19a) comprises a memory having a buckling history of the rider. The buckling history can comprise data indicative of buckling behavior of the rider. The buckling history data can be at least partially based on the first wireless communication 61 and/or on the second wireless communication 62.

In some embodiments, an account of a rider is fined in response to more than one vehicle reporting that the rider failed to fasten her seat belt. Program instructions 32 can compare buckling history data for a single rider from multiple vehicles.

In some embodiments, the second program instructions 32 of the computer system 34 are configured to fine an account 63 of the rider a first amount (e.g., in dollars) in response to the computer system 34 receiving the first wireless communication 61. The second program instructions 32 can be configured to fine the account 63 a second amount (e.g., in dollars) in response to the computer system 34 receiving the second wireless communication 62.

In some embodiments, the second program instructions 32 are configured to make the second amount larger than the first amount in response to the computer system 34 receiving the second wireless communication 62 after receiving the first wireless communication 61.

In some embodiments, the computer system 34 is configured to determine a future ride price at least partially based on the first wireless communication 61 and the second wireless communication 62 such that the future ride price is at least partially affected by a buckling history of the rider. The buckling history may affect the future ride price by increasing the future ride price. The buckling history may affect the future ride price by decreasing the future ride price.

In some embodiments, the second program instructions 32 are configured to increase the future ride price in response to the buckling history indicating the unbuckled state of the first seat belt 53 (of a first self-driving vehicle 5a) and the unbuckled state of the second seat belt 53a (of a second self-driving vehicle 5b).

Some embodiments are configured to enter a safer driving mode in response to detecting that a rider is unbuckled. The safer driving mode can decrease a probability of the vehicle getting into a collision during a period in which the seat belt of the rider is unfastened.

In some embodiments, a seat-belt monitoring system comprises a first occupancy sensor 57 configured to detect the rider sitting in the first seat 51. The first self-driving vehicle 5a can comprise first program instructions 27 configured to exit a first driving mode and enter a second driving mode in response to the first occupancy sensor 57 detecting the rider sitting in the first seat 51 and in response to the first seat belt sensor 55 detecting the unbuckled state.

In some embodiments, just detecting the unbuckled state is insufficient to trigger a reaction (because an unbuckled state could simply be due to the seat being unoccupied). Detecting the unbuckled state and detecting the rider sitting in the seat, however, can trigger a reaction, according to some embodiments.

In some embodiments, the first self-driving vehicle 5a comprises an object detection system 7a having at least one of a camera 11, a radar 8, and a lidar 9. The object detection system 7a can include any of the features of detection system 7. To reduce unnecessary redundancy, some the features of detection system 7 are not necessarily described again in the context of object detection system 7a.

Figure 11:
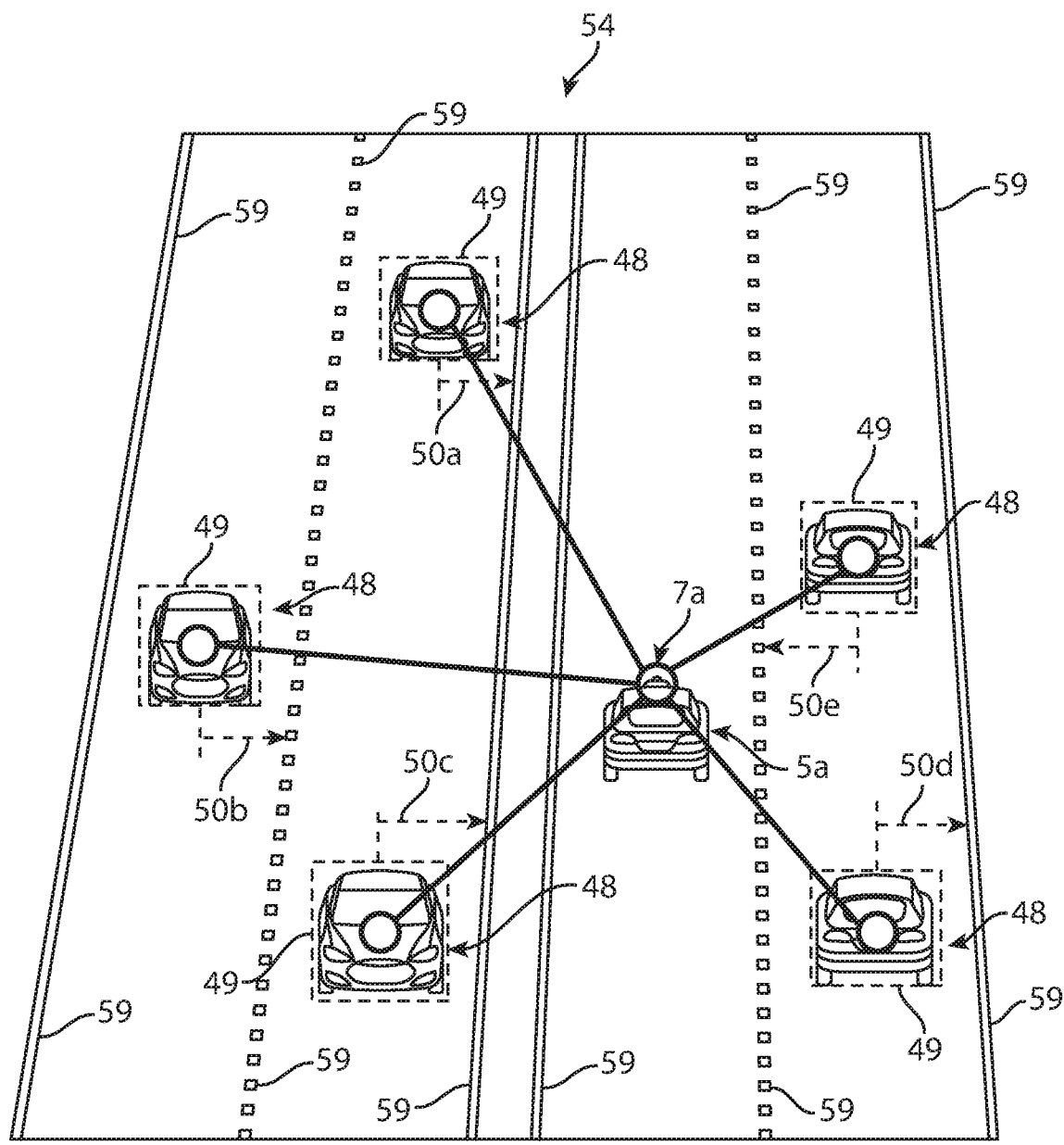
FIG. 11 illustrates a perspective view of a self-driving vehicle driving on a road, according to some embodiments.

FIG. 11 illustrates a perspective view of a self-driving vehicle 5a driving on a road 54. The first vehicle 5a uses its object detection system 7a to detect several vehicles 48.

The object detection system 7a can detect an outline 49 of each vehicle 48 using a camera 11, radar 8, and/or lidar 9. (The outlines 49 are depicted by broken line boxes in FIG. 11.) Detecting the outlines 49 can enable the detection system 7a to detect a center of each vehicle 48. (The centers are depicted by circles.) Measuring distances 50a, 50b, 50c, 50d, 50e from the centers to lane markers 59 enables the vehicle 5a to track paths of the vehicles 48.

In some embodiments, the second self-driving vehicle 5b comprises an object detection system 7b having at least one of a camera 11, a radar 8, and a lidar 9. The object detection system 7b can include any of the features of detection system 7. To reduce unnecessary redundancy, some the features of detection system 7 are not necessarily described again in the context of object detection system 7b.

An object detection system 7a can be configured to detect a second vehicle 48 on a road 54 to enable the first self-driving vehicle 5a to avoid colliding with the second vehicle 48. First program instructions 27 can be configured to maintain a greater minimum distance (and/or a greater average distance) from the first self-driving vehicle 5a to the second vehicle 48 in the second mode than in the first mode. The second mode can be configured to keep the first self-driving vehicle 5a farther away from other vehicles 48 than the first mode.

In some embodiments, the minimum distance of the second mode is less than 10 meters and the minimum distance of the first mode is less than 5 meters. In some embodiments, the minimum distance of the second mode is less than 15 meters and the minimum distance of the first mode is less than 10 meters. In some embodiments, the minimum distance of the second mode is at least two meters greater than the minimum distance of the first mode.

In some embodiments, in the first driving mode the first program instructions 27 are configured to maintain at least a first distance from the first self-driving vehicle 5a to the second vehicle 48, and in the second driving mode the first program instructions 27 are configured to maintain at least a second distance from the first self-driving vehicle 5a to the second vehicle 48, wherein the second distance is greater than the first distance.

Turning at intersections can be particularly dangerous. In the first mode, the first program instructions 27 can be configured to enable the first self-driving vehicle 5a to turn at intersections. In the second driving mode, the first program instructions 27 can be configured to prevent the first self-driving vehicle 5a from turning at intersections. Instead, the first self-driving vehicle 5a would keep going along the road until the rider fastens her seatbelt.

In some embodiments, the memory 20 comprises a driving route that includes turning at an upcoming intersection. In the first mode, the first program instructions 27 can be configured to enable the first self-driving vehicle 5a to turn at the intersection. In the second driving mode, the first program instructions 27 can be configured to prevent the first self-driving vehicle 5a from turning at the intersection.

In some embodiments, the first self-driving vehicle 5a comprises an object detection system 7a having at least one of a camera 11, a radar 8, and a lidar 9. The object detection system 7a can be configured to detect objects on roads (e.g., 54) to enable the first self-driving vehicle 5a to avoid colliding with the objects (e.g., other vehicles 48, guardrails, street signs, pedestrians).

In some embodiments, in the first driving mode the first program instructions 27 are configured to exceed a first safety threshold while using the object detection system 7a to avoid colliding with the objects while driving on the roads. In some embodiments, in the second driving mode the first program instructions 27 are configured to exceed a second safety threshold while using the object detection system 7a to avoid colliding with the objects while driving on the roads. The second safety threshold is configured to have a lower probability than the first safety threshold of colliding with objects.

Exceeding the second safety threshold (rather than just exceeding the lower first safety threshold) can include driving slower, taking turns more slowly, maintaining a greater distance from other vehicles 48, stopping more slowly, and accelerating more slowly.

In some embodiments of the first driving mode, the first program instructions 27 are configured to cause the first self-driving vehicle 5a to transport the rider. In some embodiments of the second driving mode, the first program instructions 27 are configured to cause the first self-driving vehicle 5a to find a location to park. The location to park can be located on a shoulder of a road.

For example, the first self-driving vehicle 5a may be driving from a pick-up location to a drop-off location in the first driving mode. Then, the rider may unfasten her seat belt 53. In response to the unfastening of the seat belt 53, the first self-driving vehicle 5a may cease driving toward the drop-off location (due to the second driving mode). Ceasing to drive toward the drop-off location may not necessarily happen instantly. Instead, the first self-driving vehicle 5a may search for a safe location to pull over to park. In response to the first seat belt sensor 55 detecting a fastened state of the seat belt 53, the first self-driving vehicle 5a may resume driving toward the drop-off location.

A rider may dispute that she was the person who had an unfastened seat belt. A picture may be used as evidence of the unfastened seat belt.

In some embodiments, the seat-belt monitoring system comprises a first occupancy sensor 57 configured to detect the rider sitting in the first seat 51. The first self-driving vehicle 5a can comprise a camera (e.g., 10, 10a, 10b, 11a, 11b, 24a, 24b, 24c). Camera devices 10, 10a, 10b can be coupled to a ceiling 20 of a self-driving vehicle 5, 5a, 5b, 5c such that they include cameras (e.g., 24a, 24b, 24c) directed towards the first row of seats and/or towards the second row of seats.

A camera device 11a can be integrated into the rear-view mirror of a self-driving vehicle 5, 5a, 5b, 5c. A camera device 11b can be integrated into the dash of a self-driving vehicle 5, 5a, 5b, 5c. Camera devices 10a, 10b, 11a, 11b can be placed in any area of a self-driving vehicle 5, 5a, 5b, 5c.

Figure 8:
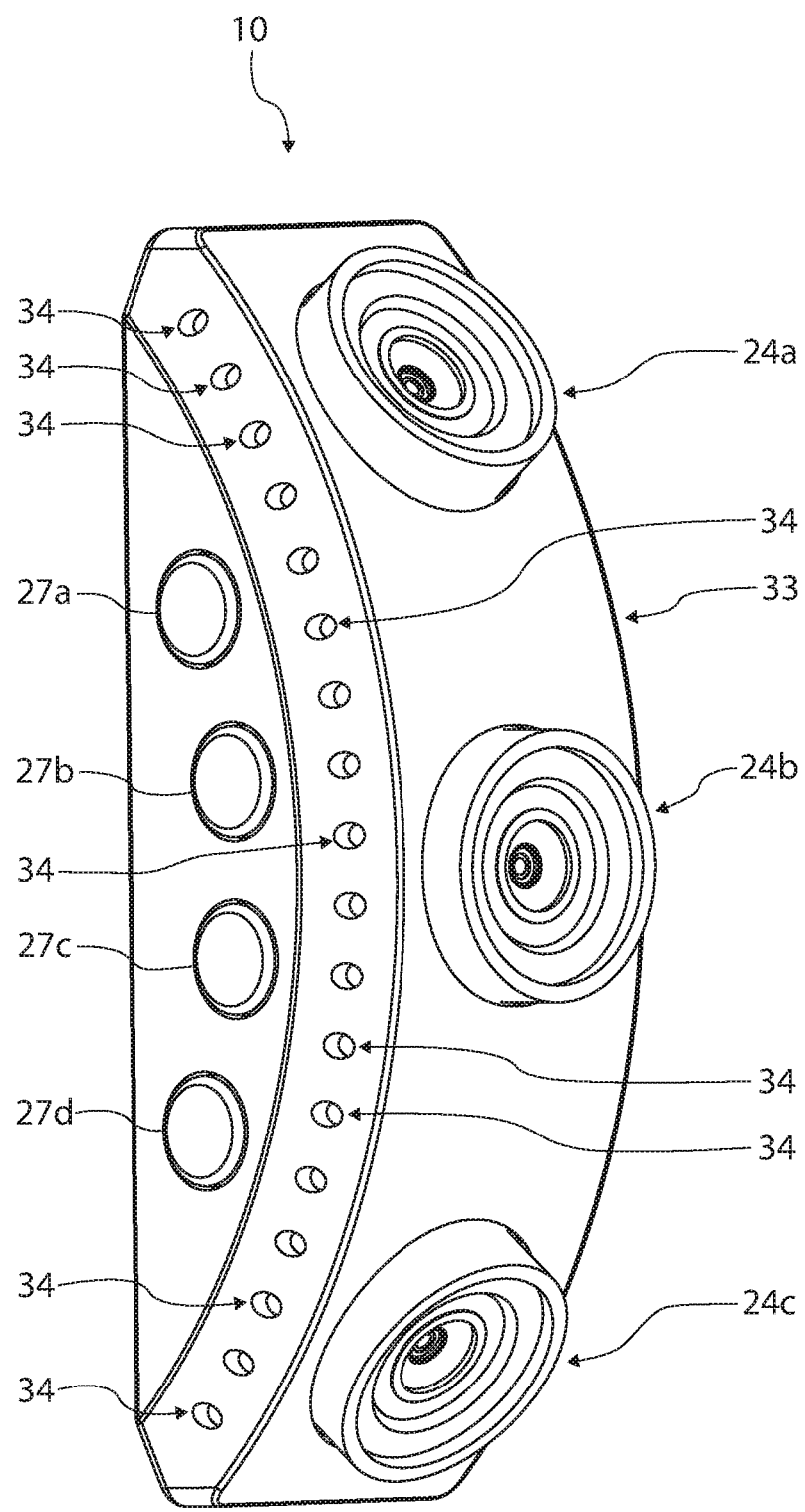
FIG. 8 illustrates a perspective view of a camera, according to some embodiments.

FIG. 8 illustrates a perspective view of a camera device 10. The camera devices 10a, 10b illustrated in FIG. 12 can include any of the features of the camera device 10 illustrated in FIG. 8.

Each camera 24a, 24b, 24c can include a wide-angle lens to provide a wider field of view, which can be particularly helpful in the small confines of a self-driving vehicle 5, 5a, 5b. The cameras 24a, 24b, 24c can be high-resolution cameras with auto-focus.

The camera device 10 can comprise a rider detection system, a communication module (with can include an antenna, a transmitter, and a receiver), a printed circuit board populated with integrated circuits and other electrical components, an image analysis system, a battery, a power management system, a microphone, a speaker, a memory with software configured to carry out the features described herein, and lights configured to illuminate the interior of a self-driving vehicle 5, 5a, 5b.

The camera device 10 can comprise a smoke detector configured to detect if a rider is smoking (e.g., cigarettes, vaping) inside the self-driving vehicle 2. Holes 34 enable the smoke to enter the camera device 10 to enable the smoke detector to detect the smoke. Not all the holes 34 are labeled to increase the clarity of other features.

The camera device 10 includes buttons that can be configured to enable the rider to interact physically with the camera device. A first button 27a is configured to summon emergency responders in response to the rider pressing the button 27a. The camera device 10 can call "911" and can provide the GPS location of the self-driving vehicle 2 to the emergency responders.

A second button 27b is configured to call a virtual assistant (or a live human assistant) in response to the rider pressing the button 27b. The assistant can be configured to answer the rider's questions. The virtual assistant can use Apple's "Siri" technology or Amazon's "Alexa" technology.

Pressing a third button 27c can notify the maintenance system that the interior of the self-driving vehicle 2 needs to be cleaned. Pressing a fourth button 27d can notify the maintenance system that the exterior of the self-driving vehicle 2 needs to be cleaned.

The camera device 10 can include an outer housing 33 (e.g., molded from plastic) that snaps onto a molded plastic base plate that is coupled to the ceiling 20 by screws. A hatch can be removed to enable plugging cables into the camera device 10. The cables can provide electrical power from a self-driving vehicle 5, 5a, 5b to the camera device 10. The cables can also communicatively couple the camera device 10 to other portions of a self-driving vehicle 5, 5a, 5b that communicatively couple a self-driving vehicle 5, 5a, 5b to a seat belt monitoring system. The cables can exit through holes 30 in the hatch.

In some embodiments, a camera device 10 is mechanically coupled to a self-driving vehicle 5, 5a, 5b and is communicatively coupled to a computer system 34 via intermediary communication systems 15. The camera device 10 can be coupled by wires or wirelessly communicatively coupled to the other elements described herein and/or incorporated by reference.

Embodiments can include any of the features of the cameras and other elements described in U.S. patent application Ser. No. 16/230,410. The entire contents of U.S. patent application Ser. No. 16/230,410 are incorporated by reference herein.

Embodiments can include any of the features of the cameras and other elements described in U.S. Patent Application 62/782,887. The entire contents of U.S. Patent Application 62/782,887 are incorporated by reference herein.

The first self-driving vehicle 5a can comprise first program instructions 27. The first program instructions 27 can be configured to cause a camera (e.g., 10, 10a, 10b, 11a, 11b, 24a, 24b, 24c) to take a picture 69 of the rider in the first seat 51 in response to the first occupancy sensor 57 detecting the rider sitting in the first seat 51 and in response to the first seat belt sensor 55 detecting the unbuckled state. The picture 69 can be a video. The picture 69 can be a still image.

In some embodiments, the seat-belt monitoring system comprises a computer system 34 having at least one computer. The computer system 34 can be located remotely relative to the first self-driving vehicle 5a (e.g., such that the computer system 34 is not mechanically coupled to the self-driving vehicle). The first program instructions 27 can be configured to send a first wireless communication 61 comprising the picture 69 to the computer system 34 (e.g., via intermediary communication systems 15) in response to the first occupancy sensor 57 detecting the rider sitting in the first seat 51 and in response to the first seat belt sensor 55 detecting the unbuckled state.

In some embodiments, a camera is always recording inside a cabin of a first self-driving vehicle 5a.

In some embodiments, the seat-belt monitoring system comprises a first occupancy sensor 57 configured to detect the rider sitting in the first seat 51. The seat-belt monitoring system can comprise a computer system 34 comprising at least one computer. The computer system 34 can be located remotely relative to the first self-driving vehicle 5a (e.g., such that the computer system 34 is not mechanically coupled to the self-driving vehicle). The computer system 34 can comprise a memory 31 having buckling history data of the rider. The first self-driving vehicle 5a can comprise a camera (e.g., 10, 10a, 10b, 11a, 11b) configured to take a picture 69 of the rider in the first seat 51 during the unbuckled state. The communication system 16 can send the picture 69 to the computer system 34.

In some embodiments, the first self-driving vehicle 5a comprises first program instructions 27 configured to send a first wireless communication 61 to the computer system 34 in response to the first occupancy sensor 57 detecting the rider sitting in the first seat 51 and in response to the first seat belt sensor 55 detecting the unbuckled state. The computer system 34 can comprise second program instructions 32 configured to save the picture 69 to the memory such that the buckling history of the rider comprises the picture 69 as evidence of the unbuckled state.

Saving the picture 69 as evidence can enable sending the picture 69 to the rider (e.g., to show the rider that she was the one who was unbuckled as the vehicle was moving). Some embodiments comprise sending the picture 69 to a remote computing device 12 of the rider (e.g., in response to the computer system 34 receiving the first wireless communication 61).

In some embodiments, the seat-belt monitoring system comprises a computer system (e.g., 34, 19, 19a) having at least one computer. The computer system can comprise program instructions (e.g., 32, 27, 27a) configured to notify the rider (e.g., at least partially in response to the program instructions analyzing at least one of road conditions, a travel route, and traffic conditions) that the rider is permitted to unbuckle the first seat belt 53.

A first self-driving vehicle 5a can comprise a road conditions monitor 29a. The road conditions monitor 29a can comprise a camera oriented toward a road to enable the road conditions monitor 29a to visually analyze the road to determine if they road is icy, if the road is wet, if there is rain, if there is snow, if there are potholes, if there are other hazards on the road.

In some embodiments, the first self-driving vehicle 5a receives road condition data from a remote road condition monitor 29. The road condition data can be based on information from other vehicles, weather reports, weather forecasts, and/or databases.

The object detection system 7a can be used to monitor traffic conditions (e.g., if many vehicles 48 are located near the first self-driving vehicle 5a. A traffic monitor 23 can receive traffic condition data from remote computers (e.g., can receive traffic data from Google).

A vehicle navigation system 14 can comprise travel route data. If the travel route has many turns, the system can be less likely to notify the rider that the rider is permitted to unbuckle the first seat belt 53.

Notifying the rider can comprise emitting audio from a speaker 71 of a self-driving vehicle 5a that is transporting the rider. The audio can include words that instruct the rider that the rider is permitted to unbuckle the first seat belt 53. For example, the words can say, "Due to predicted safe travel conditions, you are now permitted to unbuckle your seat belt."

Notifying the rider can comprise sending a wireless communication from the computer system (e.g., 34, 19, 19a) to a remote computing device 12 of the rider. The wireless communication can prompt application software (an "app") to display a message that instructs the rider that the rider is permitted to unbuckle the first seat belt 53. For example, the message displayed on a screen 90 of the remote computing device 12 can say, "Due to predicted safe travel conditions, you are now permitted to unbuckle your seat belt."

Program instructions (e.g., 32, 27, 27a) can analyze at least one of road conditions, a travel route, and traffic conditions, and then in response to the analysis, the second program instructions 32 can notify the rider that the rider is permitted to unbuckle the first seat belt 53.

Road conditions reducing the likelihood of notifying the rider that the rider is permitted to unbuckle the first seat belt 53 can include snowy roads, wet roads, rain, potholes, and curvy roads.

Travel route features reducing the likelihood of notifying the rider that the rider is permitted to unbuckle the first seat belt 53 can include turns in the travel route, little time until the next turn, inconsistent travel speeds (e.g., stopping and starting), Traffic conditions reducing the likelihood of notifying the rider that the rider is permitted to unbuckle the first seat belt 53 can include many vehicles on the road, vehicles driving poorly, and vehicles located too close to the first self-driving vehicle 5a.

Conditions of the first self-driving vehicle 5a can reduce the likelihood of notifying the rider that the rider is permitted to unbuckle the first seat belt 53. These conditions can include low tire pressure, dropping tire pressure, airbag defects, and motor warnings.

Some embodiments comprise a computer system having at least one computer. The computer system can comprise second program instructions configured to notify the rider that the rider is permitted to unbuckle the first seat belt 53. The second program instructions can be configured to notify the rider at least partially in response to analyzing at least one of road conditions, a travel route, and traffic conditions.

In some embodiments, the seat-belt monitoring system comprises a computer system (e.g., 19) having at least one computer. The first self-driving vehicle 5a can comprise an object detection system 7a having at least one of a camera 11, a radar 8, and a lidar 9. The object detection system 7a can be configured to detect a second vehicle 48. The computer system (e.g., 19) can comprise program instructions (e.g., 27) configured to notify the rider, at least partially in response to the program instructions analyzing a distance from the first self-driving vehicle 5a to the second vehicle 48, that the rider is permitted to unbuckle the first seat belt 53.

A rider may decide to unfasten her seat belt 53 during a trip, but if conditions indicate a substantial risk of a collision, the program instructions can be configured to instruct a rider to fasten her seat belt 53.

In some embodiments, a computer system (e.g., 34, 19, 19a) can comprise program instructions (e.g., 32, 27, 27a) configured to notify the rider to buckle the first seat belt 53, wherein the notifying is at least partially in response to the program instructions analyzing at least one of road conditions, a travel route, and traffic conditions. The program instructions can analyze at least one of road conditions, a travel route, and traffic conditions, and then in response to the analysis, the second program instructions can notify the rider to buckle the first seat belt 53.

Notifying the rider can comprise emitting audio from a speaker 71 of a self-driving vehicle 5a that is transporting the rider. The audio can include words that instruct the rider to buckle the first seat belt 53. For example, the words can say, "Due to predicted potentially unsafe travel conditions, you should buckle your seat belt."

Notifying the rider can comprise sending a wireless communication from the computer system (e.g., 34, 19, 19a) to a remote computing device 12 of the rider. The wireless communication can prompt application software (an "app") running on the remote computing device 12 to display a message that instructs the rider that the rider should buckle the first seat belt 53. For example, the message displayed on a screen 90 of the remote computing device 12 can say, "Due to predicted potentially unsafe travel conditions, you should buckle your seat belt."

In some embodiments, the seat-belt monitoring system comprises a computer system (e.g., 34, 19, 19a) having at least one computer. The computer system comprises program instructions (e.g., 32, 27, 27a) configured to instruct the rider to buckle the first seat belt 53 in response to the first seat belt sensor 55 detecting the unbuckled state and in response to the second program instructions 32 analyzing at least one of road conditions and traffic conditions.

In some embodiments, program instructions are configured to notify the rider that the rider is permitted to unbuckle her seat belt. If a system detects a higher risk due to any of the factors described herein, the system can instruct the rider to buckle her seat belt.

In some embodiments, the seat-belt monitoring system comprises a computer system having at least one computer. The first self-driving vehicle 5*a* can comprise an object detection system 7*a* having at least one of a camera 11, a radar 8, and a lidar 9. (An object detection system 7, 7*a*, 7*b* can include many cameras 11, radars 8, and lidars 9.)

The object detection system 7*a* can be configured to detect a second vehicle 48. The computer system (e.g., 34, 19, 19*a*) can comprise program instructions (e.g., 32, 27, 27*a*) configured to instruct the rider to buckle the first seat belt 53 in response to the first seat belt sensor 55 detecting the unbuckled state and in response to an object detection system 7*a* analyzing a distance from the first self-driving vehicle 5*a* to the second vehicle 48.

Some embodiments enable the system to determine which rider is in which seat. Knowing the identity of a rider in a particular seat can enable the system to fine the correct rider, send notifications to the correct rider, and/or maintain an accurate buckling history for each rider.

The rider can be any age. In some cases, the rider is an adult. In some cases, the rider is a young child. In some embodiments, a first rider arranges for a self-driving vehicle to provide a ride for both the first rider and a baby.

In some embodiments, the seat-belt monitoring system comprises a first weight sensor 72 configured to detect first data indicative of a first weight of the rider sitting in the first seat 51 coupled to the first self-driving vehicle 5*a*.

The seat-belt monitoring system can comprise a computer system (e.g., 34, 19*a*) comprising at least one computer. The first self-driving vehicle 5*a* can be configured to send a first wireless communication 61 comprising the first data to the computer system (e.g., 34, 19*a*). The seat-belt monitoring system can comprise a second self-driving vehicle 5*b* having a second seat 52 and a second weight sensor 72 configured to detect second data indicative of a second weight of an unknown rider sitting in the second seat. The computer system (e.g., 34, 19*a*) can comprise second program instructions (e.g., 32, 27*a*) configured to determine that the unknown rider is the rider in response to comparing the second data to the first data. The computer system (e.g., 34, 19*a*) can comprise second program instructions (e.g., 32, 27*a*) configured to determine that the unknown rider is the rider in response to analyzing which riders have been picked up and not dropped off by the vehicle.

In some embodiments, the seat-belt monitoring system comprises a first occupancy sensor 57 configured to detect the rider sitting in the first seat 51. The seat-belt monitoring system can comprise a computer system (e.g., 34, 19, 19*a*) comprising at least one computer. The computer system can comprise second program instructions (e.g., 32, 27, 27*a*) configured to receive an identification of the rider. The computer system can receive an identification of the rider from a database 64 and/or from a remote computing device 12 of the rider. The second program instructions can be configured to receive from the first occupancy sensor 57 an indication of the rider sitting in the first seat 51. The second program instructions can be configured to record that the rider is sitting in the first seat 51 in response to receiving the identification and the indication. The identification can be any type of identification configured to enable the system to identify the rider.

Some embodiments include audio and/or visual warnings. The first self-driving vehicle 5*a* can comprise an audio speaker 71. The first program instructions 27 can be configured to cause the audio speaker 71 to emit words instructing the rider to put the first seat belt 53 in the buckled state in response to the first seat belt sensor 55 detecting the unbuckled state. The words can warn the rider that the rider will receive a fine if the rider does not put the first seat belt 53 in the buckled state.

The first self-driving vehicle 5*a* can comprise at least one of an audio speaker 71 and a display screen 93. The first program instructions 27 can be configured to at least one of cause the audio speaker 71 to emit words and cause the display screen 93 to display the words. The words can be configured to warn the rider to put the first seat belt 53 in the buckled state to avoid a fine.

Figure 13A:
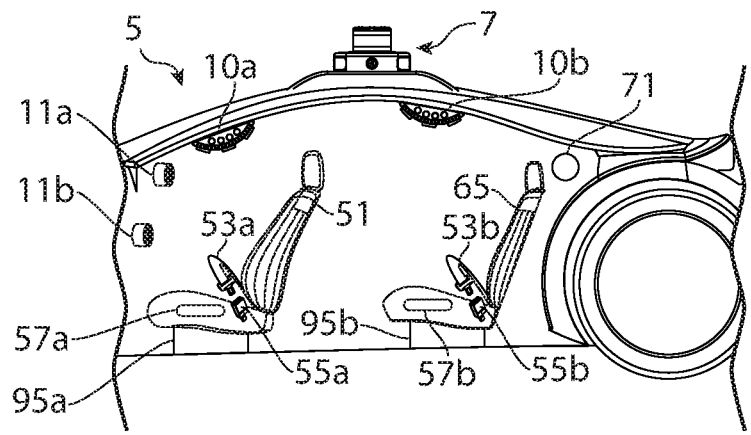
FIGS. 13a-13c illustrate diagrammatic views of a system, according to some embodiments.
Figure 13B:
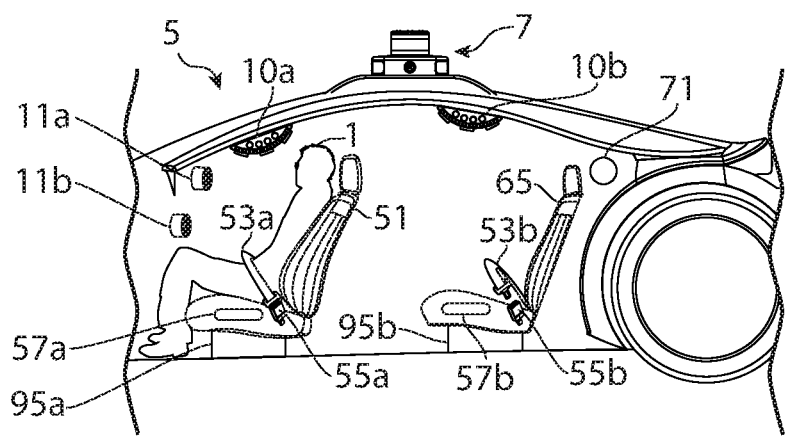
Figure 13C:
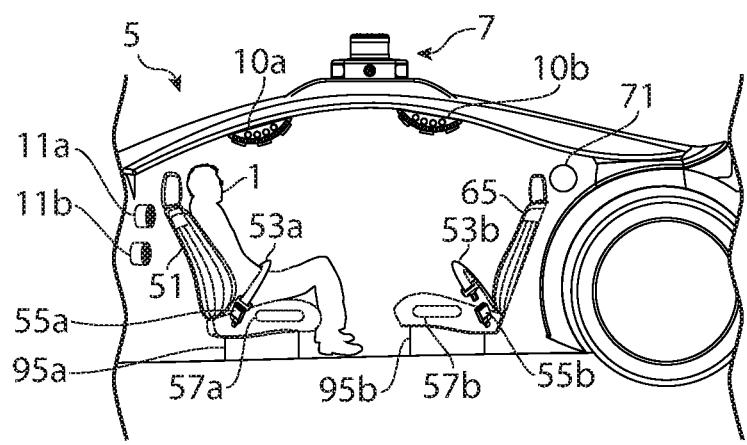

Now with reference to FIGS. 13*a*-13*c*, the self-driving vehicle 5 may be implemented with various safety features to not only detect an indication of an imminent crash or impact with another object (e.g. a car crash), but also adapt the cabin to prepare for the impact. In doing so, the cabin may provide a safer configuration to reduce the severity of an impact to one or more riders within the vehicle 5. For example, if the vehicle 5 detects an indication of an imminent impact, the seats of the vehicle 5 may rotate away from the crash to reduce injuries to the one or more riders.

Accordingly, in some embodiments, the self-driving vehicle 5 includes a first seat 51, a second seat 65, and a crash detection system 7 coupled to the vehicle. The crash detection system 7 may comprise at least one of a camera, a radar, a lidar, and an accelerometer. For example, the crash detection system 7 may determine that a crash is imminent due to the accelerometer(s) detecting an acceleration or deceleration that exceeds a predetermined threshold, which is indicative of an imminent impact.

Furthermore, the vehicle 5 may also include at least one motor 95*a* coupled to the first seat 51 and communicatively coupled to the crash detection system 7*a*. As well, the vehicle 5 may also include at least one motor 95*b* coupled to the second seat 65 and communicatively coupled to the crash detection system 7*a*. Upon detecting the sudden change in speed, the crash detection system 7 may transmit a communication to the at least one motor 95 to move the seat 51, 65 to a safer configuration. It should also be appreciated that the crash detection system 7 may transmit the communication through any ancillary device or system of the vehicle 5, such as through the vehicle management system, which thereby transmits the communication to the at least one motor 95 to move the seat 51. The at least one motor 95 may be arranged and configured to move at least one of the respective first seat 51 and second seat 65 in response to the crash detection system 7*a* detecting an indication of an imminent crash.

Figure 14:
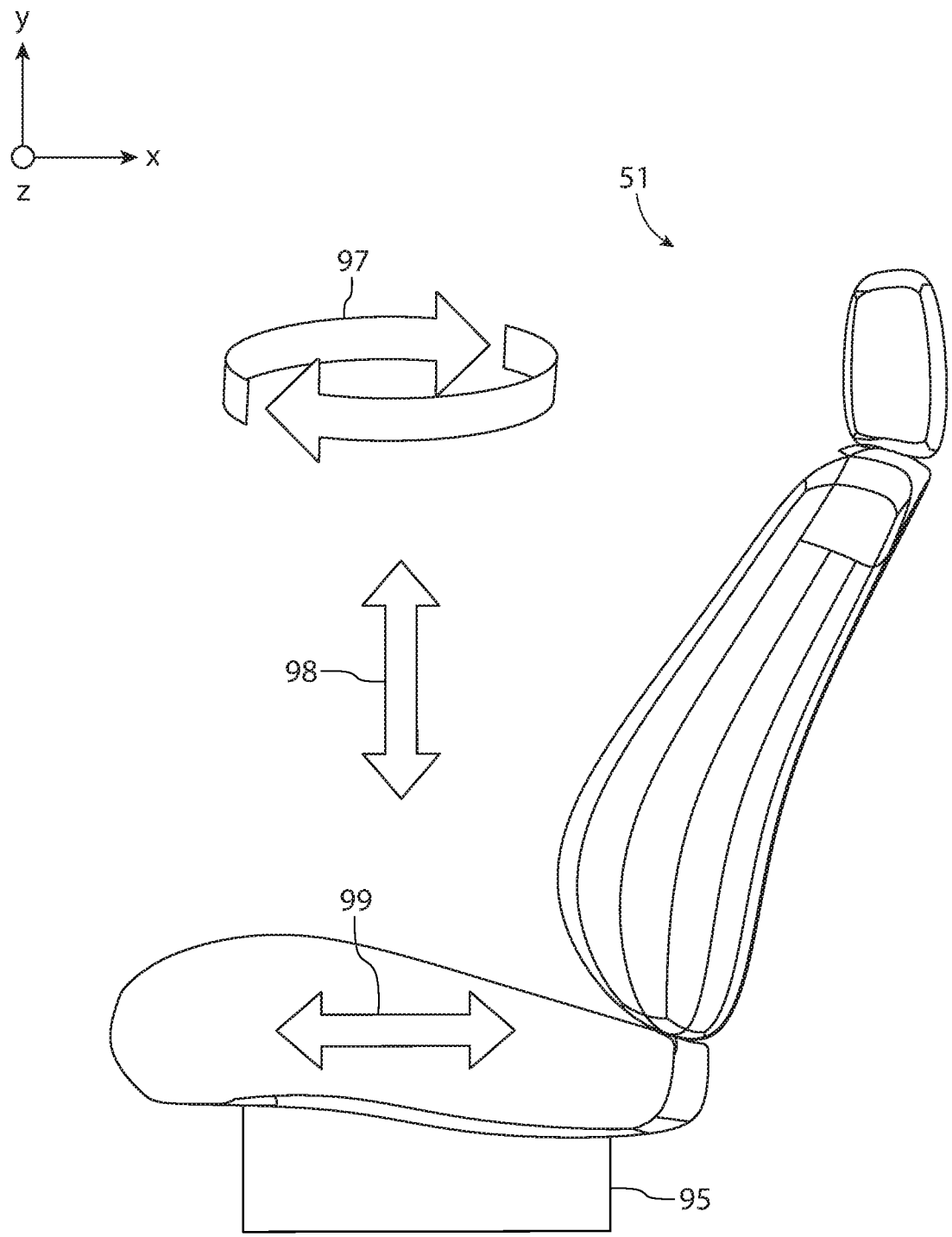
FIG. 14 illustrates a side view of a seat, according to some embodiments.

With reference to FIG. 14, the seat 51 may be arranged and configured to move in a variety of directions and/or rotations to thereby re-position the rider(s) in an orientation that may reduce the severity of injuries from an imminent danger situation, such as a crash. Regarding the movement of the seats 51, 65, the at least one motor 95 may be arranged and configured to move the seat 51, 65 in a variety of movements. In some embodiments, the movement is a rotational movement whereby the at least one motor 95 rotates the respective seat 51, 65 so that the seat 51, 65 faces away from the predicted location of the crash. The at least one motor 95 may also rotate the seat 51, 65 so that the seat 51, 65 faces a center of the vehicle 5. Generally, the at least one motor 95 may rotationally move the seat 51, 65 to any position to protect the safety of the rider 1. Accordingly, with reference to arrow 97, the seat 51 may rotate and/or spin in any direction with respect to the X, Y, and/or Z axis.

The at least one motor 95 may also be arranged and configured to move the seat 51, 65 in other directions in response to the crash detection system detecting the indication of the imminent crash. For example, in some embodiments, the at least one motor 95 may also be arranged and configured to raise or lower the seat 51, 65. As shown by arrow 98, the seat 51, 65 may raise or lower in any direction with respect to the X, Y, and/or Z axis. Additionally, as shown by arrow 99, the seat 51, 65 may move forward or backward with respect to the X, Y, and/or Z axis.

Even still, the at least one motor 95 may be arranged and configured to move various parts of the seat 51, 65. This may occur because there is not enough time to move the entire seat 51, 65 to a desired position, or the movement of the seat 51, 65 may risk the safety of the rider(s). Additionally, moving various parts of the seat 51, 65 may be intended to protect different parts of the rider's anatomy. For example, because of the severity of neck injuries, the at least one motor 95 may be arranged and configured to move at least a portion of a head rest of the seat 51, 65 in response to the crash detection system detecting the indication of the crash. Such movement of the head rest may better support the rider's neck in the event of the crash. Of course, it should be appreciated that the movement of the head rest may be to raise or lower the head rest.

Additionally, the at least one motor 95 may be arranged and configured to adjust a firmness setting of at least a portion of the seat 51, 65 in response to the crash detection system detecting the indication of the imminent crash. In some embodiments, the at least one motor 95 is arranged and configured to adjust the firmness setting to be more firm than prior to detecting the indication of the crash. Moreover, in some embodiments, the at least one motor 95 is arranged and configured to adjust the firmness setting to be less firm than prior to detecting the indication of the crash.

With continued reference to FIGS. 13a-13c, the vehicle 5 may also include an occupancy sensor 57 coupled to the seat, 51, 65, whereby the occupancy sensor 57 is configured to detect the rider 1 sitting in the first seat 51, 65. The at least one motor 95 may thereby be arranged and configured to disable movement of the seat 51, 65 in response to the occupancy sensor 57 detecting that no rider is sitting in the seat 51, 65.

In some embodiments, the self-driving vehicle 5 also includes a seat belt sensor 55 coupled to a seat belt 53 of the seat 51, 65. The seat belt sensor 55 may be configured to detect at least one of a buckled state of the seat belt 53 and an unbuckled state of the seat belt 53. In some embodiments, the at least one motor 95 is arranged and configured to disable movement of the seat 51, 65 in response to the seat belt sensor 55 detecting the unbuckled state of the seat belt 53. Moreover, the first occupancy sensor 57 may include at least one of a camera, an infrared camera, and a weight sensor.

FIGS. 13b and 13c illustrate the vehicle 5 before and after a crash, respectively. Specifically, FIG. 13b shows the seat 51 and rider prior to the crash detection system 7 detecting an indication of an imminent crash, whereby the direction of the crash is the direction that the rider is facing in FIG. 13b. FIG. 13c illustrates a period of time after the car crash has occurred whereby the at least one motor 95 has rotated the seat 51 so that the rider faces away from the crash. Furthermore, FIGS. 13b and 13c also show that the second seat 65, without a rider, did not move in response to the crash detection system 7 detecting the indication of the imminent crash.

In the past, a driver would own her vehicle, would enjoy full ownership rights over the vehicle, and would use her same vehicle day after day. In the future, however, fewer people will be drivers who own their own vehicle and more people will be guest riders who will receive transportation services from many different vehicles that they do not own. Any of the embodiments described herein can be used with a rider who is a guest rider.

In some embodiments, a fleet of self-driving vehicles is configured to provide transportation services to many guest riders. As used herein, a "guest rider" is used broadly to refer to a person who is transported by a third-party service such as a public or private transportation system configured to provide transportation services to many different people (e.g., who often do not know each other). The guest rider does not exclusively own the first self-driving vehicle 5a or the second self-driving vehicle 5b, but can receive rides from the first self-driving vehicle 5a and the second self-driving vehicle 5b (and often from many other vehicles in the fleet of self-driving vehicles).

Referring now primarily to FIGS. 5, 7-10, and 12, in some embodiments, a seat-belt monitoring system comprises a first self-driving vehicle 5a configured to transport a guest rider and comprising a first seat 51, a first seat belt 53 configured to secure the guest rider in the first seat 51, and a first seat belt sensor 55 configured to detect at least one of a buckled state of the first seat belt 53 and an unbuckled state of the first seat belt 53.

In some embodiments, a seat-belt monitoring system comprises a second self-driving vehicle 5b configured to transport the guest rider and comprising a second seat 52, a second seat belt 53a configured to secure the guest rider in the second seat 52, and a second seat belt sensor 56 configured to detect at least one of a buckled state of the second seat belt 53a and an unbuckled state of the second seat belt 53a. The seat-belt monitoring system can comprise a computer system 34 having at least one computer. The computer system 34 can be located remotely relative to the first self-driving vehicle 5a.

The first self-driving vehicle 5a can comprise first program instructions 27 configured to send a first wireless communication to the computer system 34 in response to the first seat belt sensor 55 detecting the unbuckled state. The computer system 34 can comprise second program instructions 32. The second self-driving vehicle 5b can comprise third program instructions 27a configured to send a second wireless communication to the computer system 34 in response to the second seat belt sensor 56 detecting the unbuckled state of the second seat belt 53a. The computer system 34 can be communicatively coupled (e.g., continuously or intermittently or in any other suitable way) to at least one of a first self-driving vehicle 5a and a second self-driving vehicle 5b.

The computer system 34 can comprise a memory having a buckling history of the guest rider. The buckling history can be at least partially based on the first wireless communication and the second wireless communication.

In some embodiments, the second program instructions 32 of the computer system 34 are configured to fine an account of the guest rider a first monetary amount in response to the computer system 34 analyzing the buckling history and/or in response to the computer system 34 receiving at least one of the first wireless communication and the second wireless communication. The first monetary amount can be a financial fine such as 20 dollars, 50 dollars, or any other suitable amount of money.

In some embodiments, the first wireless communication comprises an identification of the guest rider. The identification can be configured to enable the second program instructions 32 to fine the account (e.g., by enabling the computer system 34 to know which account corresponds to the person who did not buckle her seat belt or who unbuckled her seat belt while the vehicle was traveling at a speed over a predetermined threshold, which in some embodiments is at least ten miles per hour).

In some embodiments, the second program instructions 32 of the computer system 34 are configured to fine an account of the guest rider a first monetary amount in response to the computer system 34 receiving the first wireless communication, and the second program instructions 32 are configured to fine the account a second monetary amount in response to the computer system 34 receiving the second wireless communication. In some embodiments, the second program instructions 32 are configured to make the second monetary amount larger than the first monetary amount in response to the computer system 34 receiving the second wireless communication after receiving the first wireless communication.

In some embodiments, a computer system 34 comprises second program instructions 32 configured to determine a future transportation price for a ride (to be given to the guest rider) at least partially based on the buckling history of the guest rider.

In some embodiments, the second program instructions 32 are configured to determine a future transportation price for the guest rider at least partially based on the first wireless communication and the second wireless communication such that the future transportation price is at least partially based on the buckling history of the guest rider. A first guest rider with a buckling history indicative of consistently buckling a seat belt can receive a future transportation price (e.g., for a ride at 2:00 this afternoon) of five dollars while a second guest rider with a buckling history indicative of consistently not buckling a seat belt can receive a future transportation price (e.g., for a ride at 2:00 this afternoon) of ten dollars.

In some embodiments, second program instructions 32 are configured to increase the future transportation price in response to the buckling history indicating the unbuckled state of the first seat belt 53 (of the first self-driving vehicle 5*a*) and the unbuckled state of the second seat belt 53*a* (of the second self-driving vehicle 5*b*). At least one of the first program instructions 27, the second program instructions 32, and the third program instructions 27*a* can be configured to charge the future transportation price to an account of the guest rider (e.g., at least partially in response to the second program instructions 32 determining the future transportation price for the guest rider based on the first wireless communication and the second wireless communication such that the future transportation price is at least partially based on the buckling history of the guest rider).

In some embodiments, the second program instructions 32 are configured to update the buckling history in response to the computer system 34 receiving the first wireless communication and the second wireless communication. The computer system 34 can comprise fourth program instructions configured to deny a future ride request from the guest rider in response to the second program instructions 32 updating the buckling history.

In some embodiments, so many different guest riders can request rides that would occur at the same time that the seat-belt monitoring system must decide which guest riders will receive rides before other guest riders.

The second program instructions 32 can be configured to update the buckling history in response to the computer system 34 receiving the first wireless communication and the second wireless communication. The computer system 34 can comprise fourth program instructions configured to update a first ride priority indicator of the guest rider in response to the second program instructions 32 updating the buckling history. The fourth program instructions can be configured to prioritize a future ride request from the guest rider at least partially based on comparing the first ride priority indicator to a second ride priority indicator of another person who has requested transportation.

The guest rider might have a first ride priority indicator of 5.2, but the fourth program instructions can be configured to update the first ride priority indicator to 3.1 in response to the second program instructions 32 updating the buckling history (due to the computer system 34 receiving a wireless communication indicating that the guest rider did not buckle her seat belt during a recent ride from a fleet of vehicles). Another person can have a second ride priority indicator of 4.4.

The fourth program instructions can be configured to prioritize a future ride request from the guest rider at least partially based on comparing the first ride priority indicator (which is now 3.1) to a second ride priority indicator (which is currently 4.4) of another person who has requested transportation (by providing a ride to the other person before providing a ride to the guest rider due to the higher priority indicator of the other person).

In some embodiments, the first self-driving vehicle 5*a* comprises a first camera (e.g., 10, 10*a*, 10*b*) and a first occupancy sensor (e.g., 57) configured to detect the guest rider sitting in the first seat 51. The first program instructions 27 can be configured to cause the first camera to take a first picture of the guest rider in the first seat 51. The second self-driving vehicle 5*b* can comprise a second camera (e.g., 10, 10*a*, 10*b*) and a second occupancy sensor (e.g., 58) configured to detect the guest rider sitting in the second seat 52. The third program instructions 27*a* can be configured to cause the second camera to take a second picture of the guest rider in the second seat 52. The second program instructions 32 can be configured to save the first picture and the second picture to the memory such that the buckling history of the guest rider comprises the first picture and the second picture.

In some embodiments, the first self-driving vehicle 5*a* comprises a camera and a first occupancy sensor configured to detect the guest rider sitting in the first seat 51. The first program instructions 27 can be configured to cause the camera to take a picture of the guest rider in the first seat 51. The first program instructions 27 can be configured to send a third wireless communication comprising the picture to the computer system 34 in response to the first occupancy sensor detecting the guest rider sitting in the first seat 51 and in response to the first seat belt sensor 55 detecting the unbuckled state.

In some embodiments, the first self-driving vehicle 5*a* comprises a camera and a first occupancy sensor configured to detect the guest rider sitting in the first seat 51. The first program instructions 27 can be configured to cause the camera to take a picture of the guest rider in the first seat 51 in response to the first occupancy sensor detecting the guest rider sitting in the first seat 51 and in response to the first seat belt sensor 55 detecting the unbuckled state.

In some embodiments, the first program instructions 27 are configured to send a third wireless communication comprising the picture to the computer system 34 in response to the first occupancy sensor detecting the guest rider sitting in the first seat 51 and in response to the first seat belt sensor 55 detecting the unbuckled state.

Some embodiments are directed to enabling the system to determine which guest rider is sitting in which seat inside of a vehicle.

In some embodiments, the first self-driving vehicle 5a comprises a first occupancy sensor configured to detect the guest rider sitting in the first seat 51. In some embodiments, the second program instructions 32 of the computer system 34 are configured to receive an identification of the guest rider, are configured to receive from the first occupancy sensor an indication of the guest rider sitting in the first seat 51, and/or are configured to record that the guest rider is sitting in the first seat 51 in response to receiving the identification and the indication.

In some embodiments, the first self-driving vehicle 5a comprises a first camera configured to take a first picture of the guest rider sitting in the first seat 51. The second self-driving vehicle 5b can comprise a second camera configured to take a second picture of the guest rider sitting in the second seat 52.

The camera 10 can comprise a facial recognition system. Some facial recognition system embodiments use "Amazon Rekognition" (from Amazon Web Services, Inc.).

The seat-belt monitoring system can comprise a facial recognition system configured to analyze the first picture to determine a first indicator of an identification of the guest rider and configured to analyze the second picture to determine a second indicator of the identification of the guest rider. The seat-belt monitoring system can be configured to assign the first wireless communication and the second wireless communication to the buckling history of the guest rider in response to the facial recognition system determining the first indicator and the second indicator.

In some embodiments, the first self-driving vehicle 5a comprises a first weight sensor 72 configured to detect first data indicative of a first weight of the guest rider sitting in the first seat 51 of the first self-driving vehicle 5a. The first program instructions 27 of the first self-driving vehicle 5a can be configured to send a third wireless communication comprising the first data to the computer system 34. The second self-driving vehicle 5b can comprise a second weight sensor configured to detect second data indicative of a second weight of an unknown person sitting in the second seat 52 of the second self-driving vehicle 5b. The third program instructions 27a of the second self-driving vehicle 5b can be configured to send a fourth wireless communication comprising the second data to the computer system 34. The second program instructions 32 of the computer system 34 can be configured to determine that the unknown person is the guest rider in response to comparing the second data to the first data.

Any of the embodiments described herein can be used with one, two, three, four, five, or more vehicles. Some embodiments use hundreds or even thousands of vehicles.

In some embodiments, a seat-belt monitoring system comprises a first self-driving vehicle 5a configured to transport a guest rider and comprising a first seat 51, a first seat belt 53 configured to secure the guest rider in the first seat 51, and a first seat belt sensor 55 configured to detect at least one of a buckled state of the first seat belt 53 and an unbuckled state of the first seat belt 53. The seat-belt monitoring system can comprise a computer system 34 located remotely relative to the first self-driving vehicle 5a and communicatively coupled to the first self-driving vehicle 5a. The computer system 34 can comprise at least one computer. In some embodiments, the computer system 34 comprises many computers located at one or more locations.

In some embodiments, the first self-driving vehicle 5a comprises first program instructions 27 configured to send a first wireless communication to the computer system 34 in response to the first seat belt sensor 55 detecting the unbuckled state. The computer system 34 can comprise a memory having a buckling history of the guest rider. The buckling history can be at least partially based on the first wireless communication. The computer system 34 can comprise second program instructions 32 configured to fine an account of the guest rider a first monetary amount in response to the computer system 34 analyzing the buckling history.

Interpretation

To reduce unnecessary redundancy, not every element or feature is described in the context of every embodiment, but all elements and features described in the context of any embodiment herein and/or incorporated by reference can be combined with any elements and/or features described in the context of any other embodiments.

The self-driving vehicle can be any suitable vehicle. For example, the self-driving vehicle can be a Tesla Model S made by Tesla, Inc. The Tesla Model S can include the Enhanced Autopilot package and the Full Self-Driving Capability package. The Full Self-Driving Capability package includes eight active cameras to enable full self-driving in almost all circumstances.

The self-driving vehicle can also be a Waymo car made by Waymo LLC. Waymo was formerly the Google self-driving car project. Waymo has logged thousands of self-driving miles over many years. Waymo vehicles have sensors and software that are designed to detect pedestrians, cyclists, vehicles, roadwork and more from a distance of up to two football fields away in all directions. Waymo has stated that its software leverages over four million miles of real-world driving data. In some embodiments, self-driving vehicles sometimes drive themselves, sometimes are driven remotely by a computer system, and sometimes are driven manually by a human turning a steering wheel, operating pedals, and performing other driver functions. In several embodiments, a self-driving vehicle drives without a human inside the vehicle to pick up the human and then lets the human drive the vehicle. Although in some cases, the human may choose not to drive the vehicle and instead may allow the vehicle to drive itself (e.g., steer and control speed) (e.g., in response to a destination requested by the human).

A remote computing device can be a smartphone, a tablet computer, a laptop computer, a desktop computer, a server, augmented reality glasses, an implanted computer, and/or any type of computer. A rider can bring her remote computing device into the self-driving vehicle, use her remote computing device in the self-driving vehicle, and leave the self-driving vehicle with her remote computing device. In some embodiments, the rider requests a ride at her home with a remote computing device, but then leaves the remote computing device at home when she goes to get a ride from the self-driving vehicle.

In some embodiments, the remote computing device is an iPhone made by Apple Inc. or an Android phone based on software made by Alphabet Inc. The remote computing device can comprise a speaker configured to emit sounds, a microphone configured to record sounds, and a display screen configured to display images. The remote computing device can comprise a battery configured to provide electrical power to operate the remote computing device.

The phrase "communicatively coupling" can include any type of direct and/or indirect coupling between various items including, but not limited to, a self-driving vehicle, a remote computing device, and a vehicle management system. For example, a remote computing device can be communicatively coupled to a vehicle management system via servers, the Cloud, the Internet, satellites, Wi-Fi networks, cellular networks, and any other suitable communication means.

The term "price" shall be defined as the amount of money paid by a user (e.g. rider) for a ride. The price of a future ride may be at least partially determined by the buckling history of the rider. In order to reduce liability, ride share companies may want to encourage riders to wear seat belts. As such, a ride share company may charge a rider more for a future ride cost if the rider has a history of leaving her or his seat belt unbuckled, which may encourage riders to wear seat belts.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The term "app", as used in this disclosure, refers to both native apps and mobile cloud apps (and Web apps). Native apps can be installed directly on remote computing devices, whereby developers can create separate app versions for each type of remote computing device (e.g., iPhone devices and Android devices). Native apps may be stored on the remote computing device out of the box, or the native apps can be downloaded from a public or private app store and installed on the remote computing device. Self-driving vehicle data associated with native apps can be stored on the remote computing device and/or can be stored remotely and accessed by the native app. Internet connectivity may be used by some instances of apps. Other instances of apps may not use Internet connectivity. In some embodiments, apps can function without Internet connectivity.

Mobile cloud apps are very similar to Web-based apps. The main similarity is that both mobile cloud apps and Web apps run on servers external to the remote computing device and may require the use of a browser on the remote computing device to display and then use the app user interface (UI). Mobile cloud apps can be native apps rebuilt to run in the mobile cloud; custom apps developed for mobile devices; or third-party apps downloaded to the cloud from external sources. Some organizations offer both a native and mobile cloud versions of their applications. In short, the term "app" refers to both native apps and mobile cloud apps.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A seat-belt monitoring system comprising:
a first self-driving vehicle configured to transport a guest rider and comprising a first seat, a first seat belt configured to secure the guest rider in the first seat, and a first seat belt sensor configured to detect a first unbuckled state of the first seat belt;
a second self-driving vehicle configured to transport the guest rider and comprising a second seat, a second seat belt configured to secure the guest rider in the second seat, and a second seat belt sensor configured to detect a second unbuckled state of the second seat belt; and
a computer system having at least one computer and located remotely relative to the first self-driving vehicle,
wherein the first self-driving vehicle comprises first program instructions configured to send a first wireless communication to the computer system in response to the first seat belt sensor detecting the first unbuckled state, the computer system comprises second program instructions, and the second self-driving vehicle comprises third program instructions configured to send a second wireless communication to the computer system in response to the second seat belt sensor detecting the second unbuckled state of the second seat belt,
wherein the computer system comprises a memory having a buckling history of the guest rider, and the buckling history is at least partially based on the first wireless communication and the second wireless communication,
wherein the second program instructions of the computer system are configured to fine an account of the guest rider a first monetary amount in response to the computer system analyzing the buckling history.

2. The seat-belt monitoring system of claim 1, wherein the first wireless communication comprises an identification of the guest rider, and the identification is configured to enable the second program instructions to fine the account.

3. The seat-belt monitoring system of claim 1, wherein the second program instructions of the computer system are configured to fine the account a second monetary amount in response to the computer system receiving the first wireless communication, and the second program instructions are configured to fine the account a third monetary amount in response to the computer system receiving the second wireless communication.

4. The seat-belt monitoring system of claim 3, wherein the second program instructions are configured to make the third monetary amount larger than the second monetary amount in response to the computer system receiving the second wireless communication after receiving the first wireless communication.

5. The seat-belt monitoring system of claim 1, wherein the second program instructions are configured to determine a future transportation price for the guest rider at least partially based on the first wireless communication and the second wireless communication such that the future transportation price is at least partially based on the buckling history of the guest rider.

6. The seat-belt monitoring system of claim 5, wherein the second program instructions are configured to increase the future transportation price in response to the buckling history indicating the first unbuckled state of the first seat belt and the second unbuckled state of the second seat belt, wherein at least one of the first program instructions, the second program instructions, and the third program instructions is configured to charge the future transportation price to the account.

7. The seat-belt monitoring system of claim 1, wherein the second program instructions are configured to update the buckling history in response to the computer system receiving the first wireless communication and the second wireless communication,
wherein the computer system comprises fourth program instructions configured to deny a future ride request from the guest rider in response to the second program instructions updating the buckling history.

8. The seat-belt monitoring system of claim 1, wherein the first self-driving vehicle comprises a first camera and a first occupancy sensor configured to detect the guest rider sitting in the first seat, and the first self-driving vehicle comprises the first program instructions configured to cause the first camera to take a first picture of the guest rider in the first seat, wherein the computer system comprises the second program instructions,
wherein the second self-driving vehicle comprises a second camera and a second occupancy sensor configured to detect the guest rider sitting in the second seat, and the second self-driving vehicle comprises the third program instructions configured to cause the second camera to take a second picture of the guest rider in the second seat,
wherein the second program instructions are configured to save the first picture and the second picture to the memory such that the buckling history of the guest rider comprises the first picture and the second picture.

9. The seat-belt monitoring system of claim 1, wherein the first self-driving vehicle comprises a camera and a first occupancy sensor configured to detect the guest rider sitting in the first seat, the first program instructions are configured to cause the camera to take a picture of the guest rider in the first seat, and the first program instructions are configured to send a third wireless communication comprising the picture to the computer system in response to the first occupancy sensor detecting the guest rider sitting in the first seat and in response to the first seat belt sensor detecting the first unbuckled state.

10. The seat-belt monitoring system of claim 1, wherein the first self-driving vehicle comprises a camera and a first occupancy sensor configured to detect the guest rider sitting in the first seat, and the first program instructions are configured to cause the camera to take a picture of the guest rider in the first seat in response to the first occupancy sensor detecting the guest rider sitting in the first seat and in response to the first seat belt sensor detecting the first unbuckled state.

11. The seat-belt monitoring system of claim 10, wherein the first program instructions are configured to send a third wireless communication comprising the picture to the computer system in response to the first occupancy sensor detecting the guest rider sitting in the first seat and in response to the first seat belt sensor detecting the first unbuckled state.

12. The seat-belt monitoring system of claim 1, wherein the first self-driving vehicle comprises a first occupancy sensor configured to detect the guest rider sitting in the first seat, and
the second program instructions of the computer system are configured to receive an identification of the guest rider, are configured to receive from the first occupancy sensor an indication of the guest rider sitting in the first seat, and are configured to record that the guest rider is sitting in the first seat in response to receiving the identification and the indication.

13. The seat-belt monitoring system of claim 1, wherein the first self-driving vehicle comprises a first camera configured to take a first picture of the guest rider sitting in the first seat, the second self-driving vehicle comprises a second camera configured to take a second picture of the guest rider sitting in the second seat, and the seat-belt monitoring system comprises a facial recognition system configured to analyze the first picture to determine a first indicator of an identification of the guest rider and configured to analyze the second picture to determine a second indicator of the identification of the guest rider,
wherein the seat-belt monitoring system is configured to assign the first wireless communication and the second wireless communication to the buckling history of the guest rider in response to the facial recognition system determining the first indicator and the second indicator.

14. The seat-belt monitoring system of claim 1, wherein the first self-driving vehicle comprises a first weight sensor configured to detect first data indicative of a first weight of the guest rider sitting in the first seat of the first self-driving vehicle, and the first program instructions of the first self-driving vehicle are configured to send a third wireless communication comprising the first data to the computer system,
the second self-driving vehicle comprises a second weight sensor configured to detect second data indicative of a second weight of an unknown person sitting in the second seat of the second self-driving vehicle, and the third program instructions of the second self-driving vehicle are configured to send a fourth wireless communication comprising the second data to the computer system, and
the second program instructions of the computer system are configured to determine that the unknown person is the guest rider in response to comparing the second data to the first data.

15. A seat-belt monitoring system comprising:
a first self-driving vehicle configured to transport a guest rider and comprising a first seat, a first seat belt configured to secure the guest rider in the first seat, and a first seat belt sensor configured to detect a first unbuckled state of the first seat belt;
a second self-driving vehicle configured to transport the guest rider and comprising a second seat, a second seat belt configured to secure the guest rider in the second seat, and a second seat belt sensor configured to detect a second unbuckled state of the second seat belt; and
a computer system comprising a memory having a buckling history of the guest rider, wherein the buckling history is based at least partially on a first communication from the first seat belt sensor and a second communication from the second seat belt sensor,
wherein the computer system comprises first program instructions configured to update a first ride priority indicator of the guest rider in response to the buckling history of the guest rider,
wherein the first program instructions are configured to prioritize a future ride request from the guest rider at least partially based on comparing the first ride priority indicator to a second ride priority indicator of another person who has requested transportation.

16. The seat-belt monitoring system of claim 15, wherein the first self-driving vehicle comprises a first camera configured to take a first picture of the guest rider sitting in the first seat, the second self-driving vehicle comprises a second camera configured to take a second picture of the guest rider sitting in the second seat, and the seat-belt monitoring system comprises a facial recognition system configured to analyze the first picture to determine a first indicator of an identification of the guest rider and configured to analyze the second picture to determine a second indicator of the identification of the guest rider.

17. The seat-belt monitoring system of claim 16, wherein the first self-driving vehicle comprises second program instructions configured to send a third wireless communication to the computer system in response to the first seat belt sensor detecting the first unbuckled state, and the second self-driving vehicle comprises third program instructions configured to send a fourth wireless communication to the computer system in response to the second seat belt sensor detecting the second unbuckled state of the second seat belt, and
wherein the computer system comprises the memory having the buckling history of the guest rider, and the buckling history is at least partially based on the third wireless communication and the fourth wireless communication.

18. The seat-belt monitoring system of claim 17, wherein the seat-belt monitoring system is configured to assign the third wireless communication and the fourth wireless communication to the buckling history of the guest rider in response to the facial recognition system determining the first indicator and the second indicator.

19. The seat-belt monitoring system of claim 15, wherein the first self-driving vehicle comprises a first weight sensor configured to detect first data indicative of a first weight of the guest rider sitting in the first seat of the first self-driving vehicle, and the first self-driving vehicle comprises second program instructions configured to send a third wireless communication comprising the first data to the computer system, and the second self-driving vehicle comprises a second weight sensor configured to detect second data indicative of a second weight of an unknown person sitting in the second seat of the second self-driving vehicle, and the second self-driving vehicle comprises third program instructions configured to send a fourth wireless communication comprising the second data to the computer system.

20. The seat-belt monitoring system of claim 19, wherein the computer system comprises fourth program instructions configured to determine that the unknown person is the guest rider in response to comparing the second data to the first data.

\* \* \* \* \*